(12) United States Patent
Tanaka et al.

(10) Patent No.: US 7,125,086 B2
(45) Date of Patent: Oct. 24, 2006

(54) VEHICLE DYNAMICS CONTROL SYSTEM

(75) Inventors: Nobuyuki Tanaka, Kanagawa (JP); Akihiro Itoh, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 191 days.

(21) Appl. No.: 10/414,303

(22) Filed: Apr. 16, 2003

(65) Prior Publication Data

US 2003/0218378 A1 Nov. 27, 2003

(30) Foreign Application Priority Data

May 22, 2002 (JP) ............................. 2002-148019
Sep. 25, 2002 (JP) ............................. 2002-279316

(51) Int. Cl.
*B60T 8/24* (2006.01)

(52) U.S. Cl. ..................... 303/190; 303/146; 303/143

(58) Field of Classification Search ............... 303/140, 303/143, 146, 190; 701/71, 72, 81, 82, 83
See application file for complete search history.

(56) References Cited

U.S. PATENT DOCUMENTS

| | | | |
|---|---|---|---|
| 5,282,138 A | * | 1/1994 | Sano ............................. 701/81 |
| 5,941,013 A | * | 8/1999 | Ohmura ......................... 43/24 |
| 6,208,929 B1 | * | 3/2001 | Matsuno et al. ............... 701/89 |
| 6,219,609 B1 | * | 4/2001 | Matsuno et al. ............... 701/72 |
| 6,641,234 B1 | * | 11/2003 | Kost et al. ................... 303/190 |

FOREIGN PATENT DOCUMENTS

| | | |
|---|---|---|
| DE | 199 50 205 C1 | 11/2000 |
| EP | 0 574 962 A1 | 12/1993 |
| EP | 1 059 216 A2 | 12/2000 |
| EP | 1 179 464 A2 | 2/2002 |
| JP | 2000-344077 A | 12/2000 |

* cited by examiner

*Primary Examiner*—James McClellan
*Assistant Examiner*—Bradley T. King
(74) *Attorney, Agent, or Firm*—Foley & Lardner LLP

(57) ABSTRACT

In a vehicle dynamics control (VDC) system for a four-wheel-drive vehicle employing a brake control system regulating braking forces applied to road wheels independently of each other and a differential mechanism controlling a differential motion between front and rear wheel axles, a VDC controller controls a braking force of each road wheel depending on whether the vehicle is in oversteering or understeering. The VDC controller includes a braking-force compensation section that compensates for a braking force of at least one of a first wheel, which is subjected to vehicle dynamics control, and a second wheel to which a transferred braking force is transferred from the first wheel through the differential mechanism, to reduce a braking force of the second wheel and to prevent the braking force of the second wheel from exceeding a lateral grip limit of the second wheel during the vehicle dynamics control.

12 Claims, 11 Drawing Sheets

VEHICLE DYNAMICS CONTROL SYSTEM

TECHNICAL FIELD

The present invention relates to a vehicle dynamics control (VDC) system for a four-wheel-drive vehicle, and specifically to a VDC system capable of controlling a vehicle behavior by controlling a braking force applied to each road wheel so that a state variable of a turning behavior of a four-wheel-drive vehicle is brought closer to a desired value.

BACKGROUND ART

In recent years, there have been proposed and developed various vehicle dynamics control systems that control vehicle dynamic behavior concerned with the movements of automotive vehicles, such as acceleration, braking, and turning. In order to improve the vehicle stability, in particular the turning behavior, this type of vehicle dynamics control system often uses a yaw rate as a state variable of a turning behavior of a motor vehicle. For instance, when an oversteer tendency starts to develop on turns, a yawing moment by which the outward drift at the front of the vehicle occurs, is produced by applying a braking force to the outside front wheel in the turn. On the contrary, when an understeer tendency starts to develop on turns, a yawing moment by which the outward drift at the rear of the vehicle occurs, is produced by applying a braking force to the inside rear wheel in the turn. On four-wheel-drive-vehicles (4WDs) employing (i) a vehicle dynamics control system using a yaw rate as a state variable of a vehicle's turning behavior and (ii) a differential mechanism (such as a center differential) between front and rear wheel axles that permits the front axle to turn at a different speed than the rear axle while transmitting power from the propeller shaft to the front and rear wheel axles, suppose a braking force is applied to the outside front wheel in the turn so as to suppress oversteer tendencies during vehicle dynamics control. The outside front wheel in the turn, which is subjected to vehicle dynamics control, is hereinafter referred to as a "VDC controlled wheel". If the braking force is applied to the VDC controlled wheel to suppress oversteer tendencies on turns and additionally the differential motion between front and rear wheel axles is limited by means of the differential mechanism, a braking force substantially corresponding to the braking force applied to the VDC controlled wheel is transferred from the VDC controlled wheel through the differential mechanism to each of rear wheels. Each road wheel, on which the transferred braking force acts, is hereinafter referred to as a "VDC noncontrolled wheel". Owing to the transferred braking force, a lateral grip force of each VDC noncontrolled wheel (each rear wheel) on the road tends to reduce, thus undesirably increasing the oversteer tendency of yaw. In the same manner, suppose a braking force is applied to the inside rear wheel in the turn so as to suppress understeer tendencies during vehicle dynamics control. In this case, the inside rear wheel in the turn, which is subjected to vehicle dynamics control, is a "VDC controlled wheel". If the braking force is applied to the VDC controlled wheel to suppress understeer tendencies on turns with the differential mechanism held in active operation, a braking force substantially corresponding to the braking force applied to the VDC controlled wheel is transferred from the VDC controlled wheel through the differential mechanism to each front wheel (each VDC noncontrolled wheel). Owing to the transferred braking force, a lateral grip force of each front wheel on the road tends to reduce, thus undesirably increasing the understeer tendency of yaw. Assuming that the driver depresses the brake pedal during vehicle dynamics control executed for suppressing oversteer or understeer tendencies on turns, there is an increased tendency for the lateral grip force of each of the aforementioned VDC noncontrolled wheels on the road to reduce due to the transferred braking force. To avoid this, Japanese Patent Provisional Publication No. 2000-344077 (hereinafter is referred to as "JP2000-344077") corresponding to European Patent Application No. 1 059 216) has taught the inhibition of vehicle dynamics control (vehicle behavior control) or the braking force compensation at each individual wheel during vehicle dynamics control, when a differential motion between front and rear wheel axles is limited by a differential mechanism (e.g., with a central differential locked up).

SUMMARY OF THE INVENTION

However, assuming that the vehicle dynamics control is simply terminated or inhibited when the differential mechanism (the center differential) becomes shifted from inoperative to operative and thus the differential motion between front and rear wheel axles becomes limited, the vehicle dynamics control cannot be continuously executed even in presence of a demand for the vehicle dynamics control, thus reducing vehicle stability, in particular turning stability. JP2000-344077 also teaches the compensation for the braking force of each individual wheel during vehicle dynamics control with the limited differential motion (with the center differential in active operation). Concretely, according to the system of JP2000-344077, the braking force of each wheel is compensated for depending on a state variable of a vehicle's spin that is representative of whether the vehicle is oversteering or understeering. The state variable of the vehicle's spin generally tends to change with a slight time delay as compared to a change in lateral grip force of each road wheel. This is because the vehicle behavior changes after the lateral-grip-force change has already occurred. Therefore, a control responsiveness of vehicle dynamics control based on the state variable of the vehicle's spin is somewhat inferior to a VDC system control responsiveness based on the lateral-grip-force change.

Accordingly, it is an object of the invention to provide an improved vehicle dynamics control system for a four-wheel-drive (4WD) vehicle, which avoids the aforementioned disadvantages, namely a lateral grip force drop of each VDC noncontrolled wheel, occurring owing to a transferred braking force from a VDC controlled wheel through a differential mechanism to each of the VDC noncontrolled wheels, and a degraded VDC-system control responsiveness.

In order to accomplish the aforementioned and other objects of the present invention, a vehicle dynamics control system for a four-wheel-drive vehicle employing a brake control system regulating braking forces applied to road wheels independently of each other and a differential mechanism controlling a differential motion between front and rear wheel axles, comprises a braking-force compensation section that compensates for a braking force of at least one of a first wheel, which is subjected to vehicle dynamics control, and a second wheel to which a transferred braking force substantially corresponding to the braking force applied to the first wheel is transferred from the first wheel through the differential mechanism, to reduce a braking force of the second wheel exceeding a lateral grip limit of the second wheel during the vehicle dynamics control.

The other objects and features of this invention will become understood from the following description with reference to the accompanying drawings.

DESCRIPTION OF THE PREFERRED EMBODIMENTS

Figure 1:
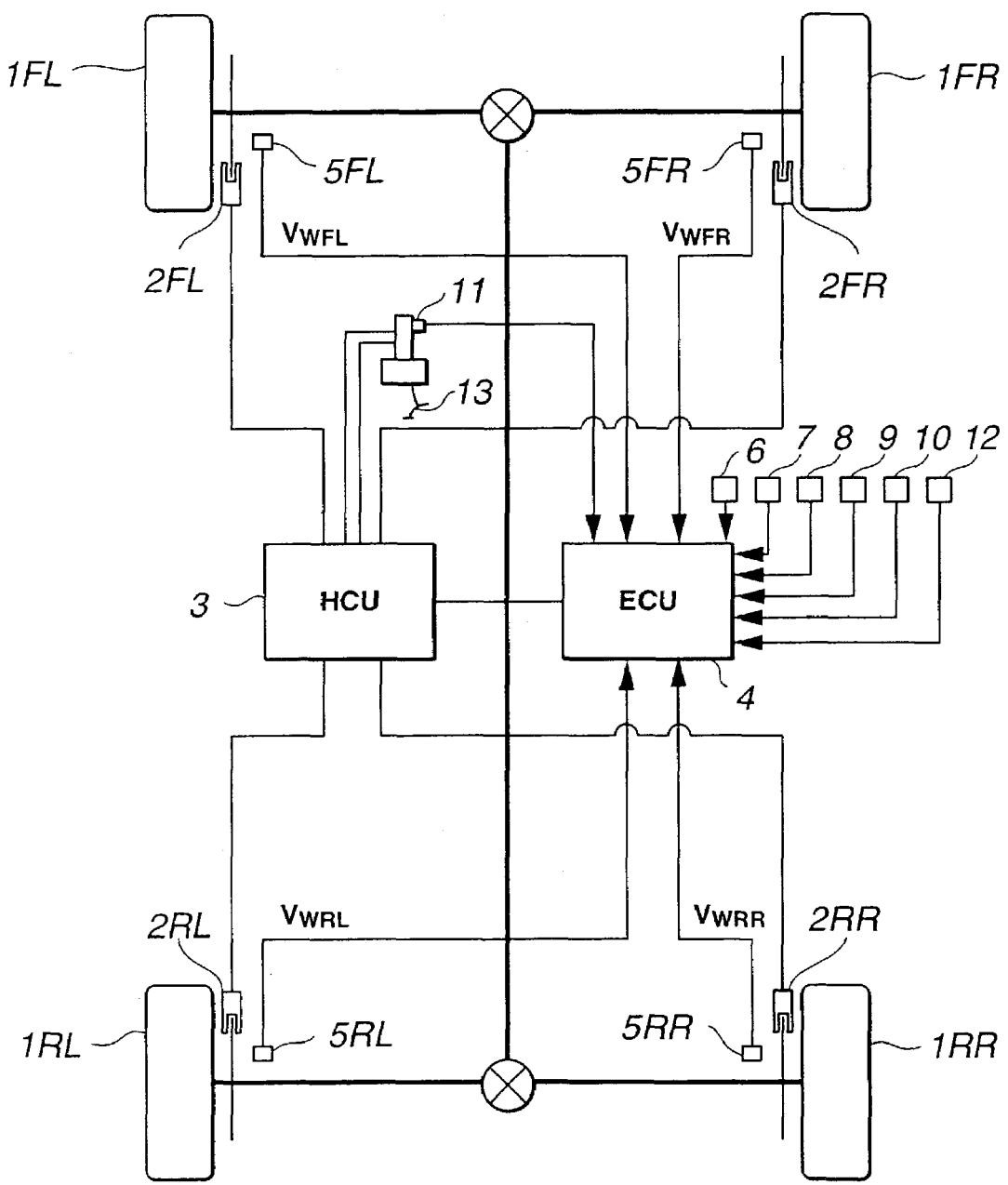
FIG. 1 is a system block diagram illustrating one embodiment of a vehicle dynamics control (VDC) system for a four-wheel-drive vehicle.

Referring now to the drawings, particularly to FIG. 1, for the purpose of simplification of the disclosure, a vehicle dynamics control system of the embodiment is exemplified in a so-called rigid four-wheel-drive (4WD) vehicle in which a differential motion between front and rear wheel axles is limited. As shown in FIG. 1, front-left, front-right, rear-left, and rear-right wheel-brake cylinders 2FL, 2FR, 2RL, and 2RR are respectively attached to front-left, front-right, rear-left, and rear-right road wheels 1FL, 1FR, 1RL and 1RR. In the shown embodiment, disk-type hydraulic brakes are used. In lieu thereof, the other type of brakes, for example, drum-type hydraulic brakes may be used. Brake fluid pressures applied to wheel-brake cylinders 2FL, 2FR, 2RL, and 2RR can be automatically generated and regulated (built up or reduced) independently of each other by means of a hydraulic control unit (HCU) 3, separately from a brake fluid pressure produced within each wheel-brake cylinder by the driver's brake pedal depression. HCU 3 is similar to a hydraulic modulator that is one of major components of a four-channel ABS system. Actually, brake fluid pressures Pfl, Pfr, Prl, and Prr applied to respective wheel-brake cylinders 2FL, 2FR, 2RL, and 2RR are controlled in response to control command signals from an electronic control unit (ECU) or a VDC controller 4 to hydraulic control unit 3. Electronic control unit (VDC controller) 4 generally comprises a microcomputer and a drive circuitry. The VDC controller includes an input/output interface (I/O), memories (RAM, ROM), and a microprocessor or a central processing unit (CPU). The input/output interface (I/O) of VDC controller 4 receives input information from various engine/vehicle switches and sensors, namely front-left, front-right, rear-left, and rear-right wheel-speed sensors 5FL, 5FR, 5RL, and 5RR, a steer angle sensor 6, a vehicle speed sensor 7, a yaw rate sensor 8, a longitudinal G sensor 9, a brake switch 10, a master-cylinder pressure sensor 11, and a VDC off switch 12. Front-left, front-right, rear-left, and rear-right wheel-speed sensors 5FL, 5FR, 5RL, and 5RR are located at the respective road wheels 1FL, 1FR, 1RL, and 1RR to sense front-left, front-right, rear-left, and rear-right wheel speeds $V_{WFL}$, $V_{WFR}$, $V_{WRL}$ and $V_{WRR}$, which are collectively referred to as "$V_W$". Steer angle sensor 6 is provided to detect a steer angle θ. Vehicle speed sensor 7 tells the VDC controller at what speed the vehicle is moving and to generate a vehicle speed indicative signal VSP. Yaw rate sensor 8 detects or monitors an actual yaw rate $\phi$ (sometimes called "yaw velocity", that is, the angular velocity of the vehicle about the z-axis of the vehicle axis system (x, y, z)). Longitudinal G sensor 9 is provided to monitor a longitudinal acceleration αv exerted on the vehicle. Brake switch 10 is located near brake pedal 13 to detect depression of brake pedal 13. Master-cylinder pressure sensor 11 is attached to the brake master-cylinder for detecting a master-cylinder pressure Pm. When a demand for yaw rate control is absent and thus a yaw-rate-control enabling flag is reset (=0), VDC off switch 12 is turned ON so as to disable (or disengage) the yaw rate control function. Conversely when the demand for yaw rate control is present and thus the yaw-rate-control enabling flag is set (=1), VDC off switch 12 is turned OFF so as to enable (or engage) the yaw rate control function. Within the VDC controller, the central processing unit (CPU) allows the access by the I/O interface of input informational data signals from the previously-discussed engine/vehicle switches and sensors 5FL, 5FR, 5RL, 5RR, 6, 7, 8, 9, 10, 11, and 12. The CPU of VDC controller 4 is responsible for carrying the various control programs stored in the memories and capable of performing necessary arithmetic and logic operations. Computational results (arithmetic calculation results), that is, calculated output signals (e.g., solenoid drive currents) are relayed through the output interface circuitry (having a digital-to-analog conversion function) via the drive circuitry (having an amplification function that amplifies an input signal from the output interface circuitry to produce a drive signal) to output stages, namely electromagnetic solenoid valves constructing part of HCU 3. Within VDC controller 4, the vehicle-dynamics-control management processing is basically executed as a general integrated VDC control routine (or a main yaw-rate-control program) by the CPU of VDC controller 4, such that actual yaw rate φ is brought closer to desired yaw rate φ*. As described later, each of the first (see FIG. 2), second (see FIG. 8), third (see FIG. 11), and fourth (see FIG. 14) brake fluid pressure compensation routines is executed to compensate for brake fluid pressures (wheel-brake cylinder pressures) Pj for the VDC controlled wheel and/or VDC noncontrolled wheels. Concretely, in the VDC system of the shown embodiment, desired yaw rate φ* is estimated based on both the vehicle speed VSP and steer angle θ. Briefly speaking, according to the general VDC control routine, a braking force for each road wheel is calculated or estimated so that actual yaw rate φ is brought closer to desired yaw rate φ*. To achieve the estimated braking force for each wheel, VDC controller 4 generates command signals, respectively indicating brake fluid pressures Pfl, Pfr, Prl, and Prr for front-left, front-right, rear-left, and rear-right wheel-brake cylinders 2FL, 2FR, 2RL, and 2RR, to HCU 3. On turns, to achieve the estimated braking force for each wheel, VDC controller 4 generates command signals, respectively indicating brake fluid pressures Pfo, Pfi, Pro, and Pri for turning outside front, turning inside front, turning outside rear, and turning inside rear wheel-brake cylinders, to HCU 3. Front-left, front-right, rear-left, and rear-right wheel-brake cylinder pressures Pfl, Pfr, Prl, and Prr (or turning outside front, turning inside front, turning outside rear, and turning inside rear wheel-brake cylinder pressures Pfo, Pfi, Pro, and Pri) are collectively referred to as wheel-brake cylinder pressure (brake fluid pressure) Pj. HCU 3 also includes a pump similar to an ABS pump (a return pump) used for an ABS system. The pump of HCU 3 is required for wheel-brake-cylinder pressure build-up operating mode or wheel-brake-cylinder pressure reduction operating mode, both executed during vehicle dynamics control. The operation of the pump can also be controlled by a control signal from VDC controller 4.

As is generally known, steer characteristics vary depending on the type of vehicle and operation. However, during driving on icy or wet roads, automotive vehicles may often experience understeer and oversteer tendencies. Electronic vehicle dynamics control (yaw rate control) is advantageous to effectively suppress the undesirable understeer or oversteer tendencies, by controlling the braking force applied to each individual road wheel. First, a reference value of brake fluid pressure Pj of each road wheel is calculated by way of the general VDC control routine performed within the processor of VDC controller 4. Second, in order to balance both the vehicle dynamics control and the differential mechanism control of the four-wheel-drive vehicle (4WD) that a differential motion between front and rear wheel axles is limited by means of the differential mechanism, and simultaneously to enhance a VDC system's control responsiveness, the reference value of brake fluid pressure Pj of each wheel is compensated for according to the brake fluid pressure compensation routine shown in FIGS. 2, 8, 11, or 14 (described later). For the purpose of simplification of the disclosure, in the VDC system of the shown embodiment, to suppress oversteer tendencies during vehicle dynamics control, a braking force is applied to only the outside front wheel in the turn. In this case, the outside front wheel corresponds to the VDC controlled wheel during oversteer suppression control. In contrast, to suppress understeer tendencies during vehicle dynamics control, a braking force is applied to only the inside rear wheel in the turn. In this case, the inside rear wheel corresponds to the VDC controlled wheel during understeer suppression control.

Figure 2:
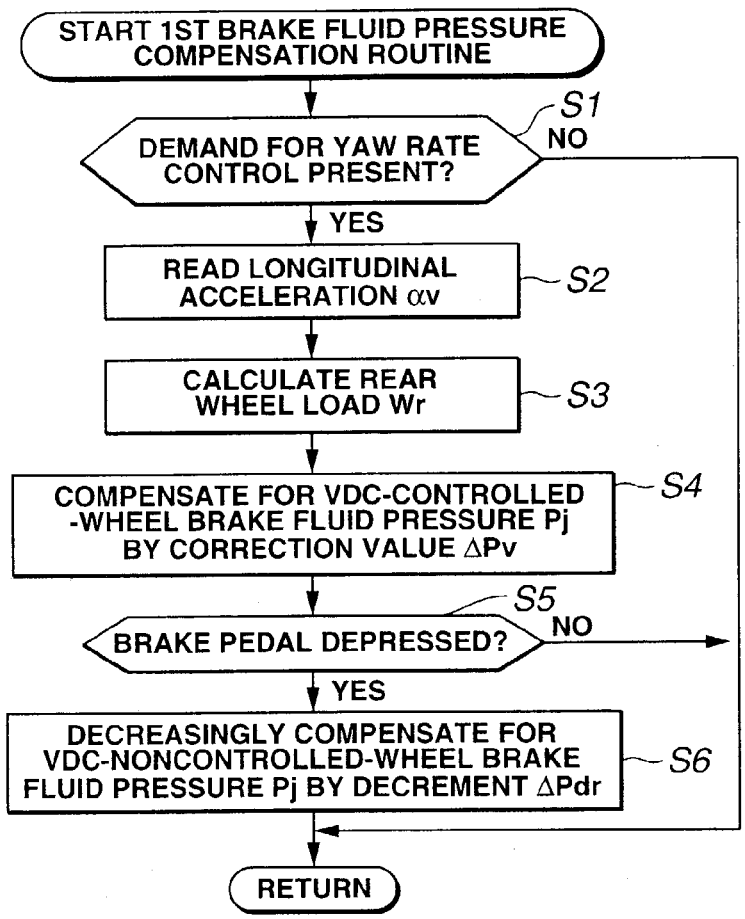
FIG. 2 is a flow chart illustrating a first brake fluid pressure compensation routine executed within a processor of an electronic control unit incorporated in the VDC system of the embodiment.

Referring now to FIG. 2, there is shown the 1st brake fluid pressure compensation routine that is executed during vehicle dynamics control (yaw rate control). The 1st brake fluid pressure compensation routine shown in FIG. 2 is executed as time-triggered interrupt routines to be triggered every predetermined sampling time intervals ΔT such as 10 milliseconds.

At step S1, a check is made to determine, based on the computational result, more concretely, a yaw-moment controlled variable ΔM obtained by the yaw-moment controlled variable ΔM arithmetic processing of FIG. 10 (described later), whether a demand for yaw rate control is present or absent. When the answer to step S1 is in the affirmative (YES) and thus the reference value of brake fluid pressure Pj of each wheel is calculated based on yaw-moment controlled variable ΔM, the routine proceeds from step S1 to step S2. Conversely when the answer to step S1 is in the negative (NO), that is, in the absence of the demand for yaw rate control, the program exits this subroutine and returns to the main program.

At step S2, longitudinal acceleration αv exerted on the vehicle is read.

Figure 3:
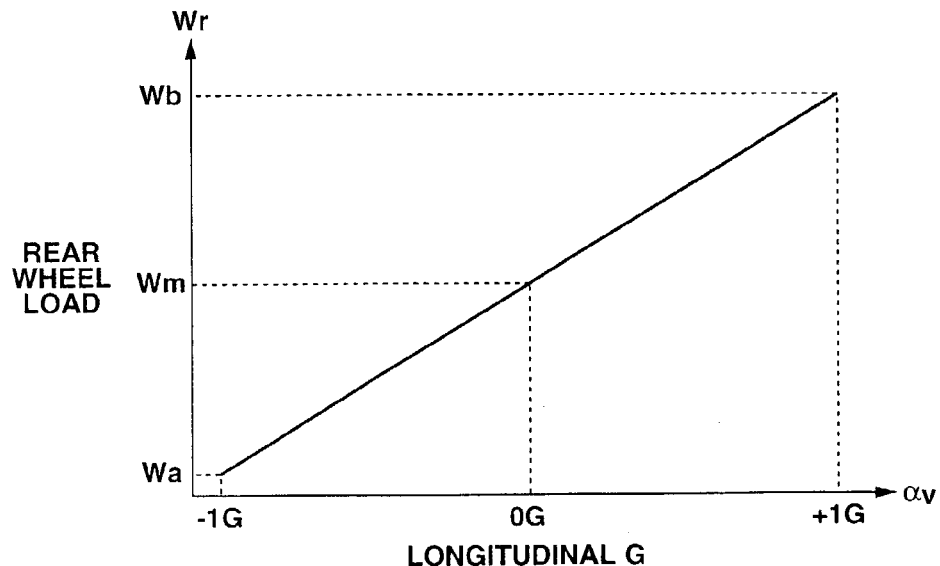
FIG. 3 is a preprogrammed characteristic map showing the relationship between a longitudinal acceleration αv and a rear wheel load Wr.

Then, at step S3, rear wheel load Wr is arithmetically calculated or retrieved based on longitudinal acceleration αv from the preprogrammed characteristic map showing how rear wheel load Wr varies relative to longitudinal acceleration αv. As can be seen from the characteristic map of FIG. 3, rear wheel load Wr is a monotone increasing function Wr=f(αv) that rear wheel load Wr increases as longitudinal acceleration αv increases. In FIG. 3, the plus longitudinal acceleration αv ranging from 0G to +1G means vehicle acceleration. On the other hand, the minus longitudinal acceleration αv ranging from 0G to −1G means vehicle deceleration. Wb means a rear wheel load at the longitudinal acceleration αv of +1G. Wa means a rear wheel load at the longitudinal acceleration αv of −1G. Wb is hereinafter referred to as "predetermined maximum rear wheel load", whereas Wa is hereinafter referred to as "predetermined minimum rear wheel load". On the other hand, Wm means an ordinary rear wheel load value obtained when the VDC system equipped 4WD is stationary or coasting without any fore-and-aft load shift. In case of the 1st brake fluid pressure compensation routine of FIG. 2, note that a state of the lateral grip of each wheel on a road surface is determined or estimated by way of the magnitude of rear wheel load Wr (in other words, the magnitude of front wheel load Wf, because of Wr+Wf=C, where C is constant). Thereafter, step S4 occurs.

Figure 4:
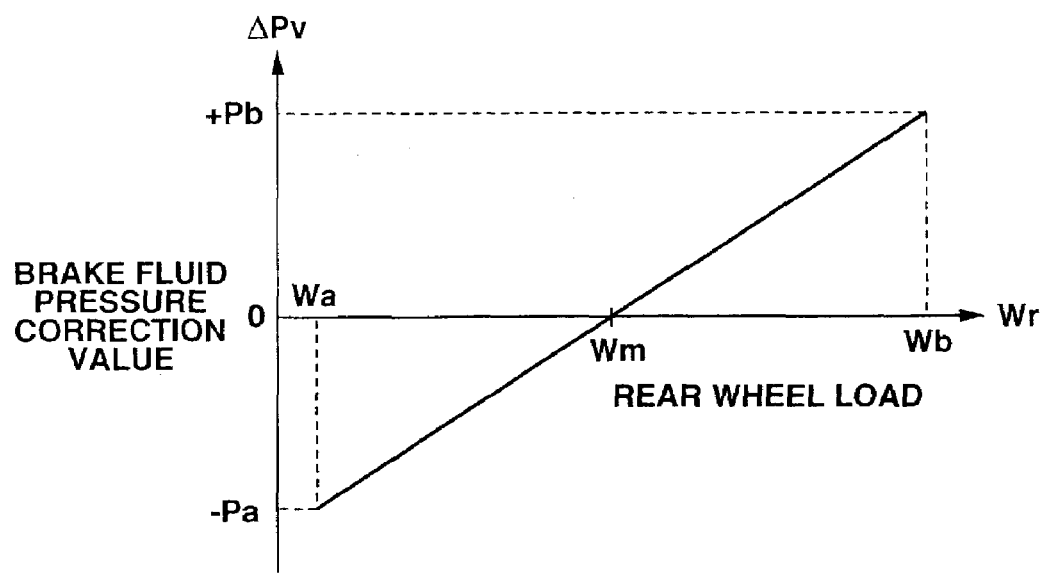
FIG. 4 is a preprogrammed characteristic map showing the relationship between rear wheel load Wr and a brake fluid pressure correction value ΔPv.

At step S4, first of all, a check is made to determine, based on the computational result, more concretely, the sign of yaw-moment controlled variable ΔM obtained by the general VDC control routine, if the VDC system equipped 4WD is in an understeer suppression control mode (that is, in case that the sign of yaw-moment controlled variable ΔM is positive) or in an oversteer suppression control mode (that is, in case that the sign of yaw-moment controlled variable ΔM is negative). If the VDC equipped 4WD is in the understeer suppression control mode, braking forces, exactly reference values of turning outside front, turning inside front, turning outside rear, and turning inside rear brake fluid pressures Pfo, Pfi, Pro, and Pri are basically calculated according to the general VDC control routine in a manner so as to achieve the positive yaw-moment controlled variable ΔM. And then, according to the 1st brake fluid pressure compensation routine, during the understeer suppression control mode, a brake fluid pressure value, obtained by subtracting a brake fluid pressure correction value ΔPv from a current value of the reference value of turning inside rear wheel (VDC controlled wheel) brake fluid pressure Pri, is set to a new command value Pri*$_{(new)}$ for turning inside rear wheel brake fluid pressure Pri. Conversely when the VDC equipped 4WD is in the oversteer suppression control mode, reference values of turning outside front, turning inside front, turning outside rear, and turning inside rear brake fluid pressures Pfo, Pfi, Pro, and Pri are basically calculated according to the general VDC control routine in a manner so as to achieve the negative yaw-moment controlled variable ΔM. And then, according to the 1st brake fluid pressure compensation routine, during the oversteer suppression control mode, a brake fluid pressure value, obtained by adding a brake fluid pressure correction value ΔPv to a current value of the reference value of turning outside front wheel (VDC controlled wheel) brake fluid pressure Pfo, is set to a new command value Pfo*$_{(new)}$ for turning outside front wheel brake fluid pressure Pfo. In this manner, the brake fluid pressure of the VDC controlled wheel itself (corresponding to rear-right wheel 1RR during understeer suppression control on the right-hand turn or corresponding to front-left wheel 1FL during oversteer suppression control on the right-hand turn) is properly compensated for by the previously-noted brake fluid pressure correction value ΔPv. As can be seen from the preprogrammed characteristic map shown in FIG. 4, brake fluid pressure correction value ΔPv is arithmetically calculated or map-retrieved based on rear wheel load Wr from the predetermined or preprogrammed characteristic map showing how brake fluid pressure correction value ΔPv varies relative to rear wheel load Wr. According to the preprogrammed Wr–ΔPv characteristic map shown in FIG. 4, brake fluid pressure correction value ΔPv increases linearly, as rear wheel load Wr increases. As clearly shown in FIG. 4, brake fluid pressure correction value ΔPv changes from "0" to a predetermined positive maximum brake fluid pressure correction value +Pb in a linear fashion, as rear wheel load Wr increases from ordinary rear wheel load Wm to predetermined maximum rear wheel load Wb, in other words, as the acceleration rate gradually increases. Also, brake fluid pressure correction value ΔPv changes from "0" to a predetermined negative maximum brake fluid pressure correction value −Pb in a linear fashion, as rear wheel load Wr decreases from ordinary rear wheel load Wm to predetermined minimum rear wheel load Wa, in other words, as the deceleration rate gradually increases. After step S4, the routine proceeds to step S5.

At step S5, a check is made to determine, based on the signal from brake switch 10, whether the driver depresses brake pedal 3. In the presence of the driver's brake-pedal depression during vehicle dynamics control (yaw rate control), the routine proceeds from step S5 to step S6. Conversely in the absence of the driver's brake-pedal depression during vehicle dynamics control, the program exits this subroutine and returns to the main program.

At step S6, when the sign of yaw-moment controlled variable ΔM obtained by the yaw-moment controlled variable ΔM arithmetic processing of FIG. 10 (described later) is positive, that is, during the understeer suppression control mode, a brake fluid pressure value, obtained by subtracting a brake fluid pressure decrement ΔPdr from the current value of turning outside front wheel (VDC noncontrolled wheel) brake fluid pressure Pfo, calculated through step S4, is set to a new command value Pfo*$_{(new)}$. At the same time, a brake fluid pressure value, obtained by subtracting brake fluid pressure decrement ΔPdr from the current value of turning inside front wheel (VDC noncontrolled wheel) brake fluid pressure Pfi, calculated through step S4, is set to a new command value Pfi*$_{(new)}$. In a similar manner, when the sign of yaw-moment controlled variable ΔM is negative, that is, during the oversteer suppression control mode, a brake fluid pressure value, obtained by subtracting brake fluid pressure decrement ΔPdr from the current value of turning outside rear wheel (VDC noncontrolled wheel) brake fluid pressure Pro, calculated through step S4, is set to a new command value Pro*$_{(new)}$. At the same time, a brake fluid pressure value, obtained by subtracting brake fluid pressure decrement ΔPdr from the current value of turning inside rear wheel (VDC noncontrolled wheel) brake fluid pressure Pri, calculated through step S4, is set to a new command value Pri*$_{(new)}$. In this manner, in the presence of the driver's brake-pedal depression during vehicle dynamics control, the brake fluid pressure of each VDC noncontrolled wheel (corresponding to front wheels 1FL, 1FR on which the transferred braking forces act during understeer suppression control or corresponding to rear wheels 1RL, 1RR on which the transferred braking forces act during oversteer suppression control) is decreasingly compensated for by the previously-noted brake fluid pressure decrement ΔPdr. In determining or setting brake fluid pressure decrement ΔPdr, it is preferable to take into account various factors, such as the magnitude of the driver's brake-pedal depression (or the vehicle's deceleration rate or the degree of fore-and-aft load shift), a lateral-grip-force limit (correlated to slip rate Sj), a margin for lateral grip of the VDC noncontrolled wheel on the road, and the like. For instance, it is preferable to set brake fluid pressure decrement ΔPdr, such that brake fluid pressure decrement ΔPdr increases as the driver's brake-pedal depression increases. In lieu thereof, brake fluid pressure decrement ΔPdr may be set to half the brake fluid pressure applied to the VDC controlled wheel for the purpose of yaw rate control. Alternatively, brake fluid pressure decrement ΔPdr may be set, so that slip rate Sj of the VDC noncontrolled wheel reduces and converges to below a predetermined value. That is to say, taking into account the lateral-grip-force limit of each VDC noncontrolled wheel on the road, brake fluid pressure decrement ΔPdr has to be set, so that the braking force of the VDC noncontrolled wheel can be reduced by an excess of the sum of (i) a first braking force and (ii) a second braking force (a so-called transferred braking force) over a lateral-grip-force limit of the VDC noncontrolled wheel on the road. The first braking force means a braking force that is applied to the VDC noncontrolled wheel by way of the driver's brake-pedal depression. On the other hand, the second braking force means the transferred braking force that is transferred from the VDC controlled wheel through the propeller shaft and the differential mechanism to the VDC noncontrolled wheel. Also, brake fluid pressure decrement ΔPdr may be set, so that the brake fluid pressure Pfo, Pfi (i.e., Pfl, Pfr) applied to each VDC noncontrolled wheel becomes zero.

Figure 5:
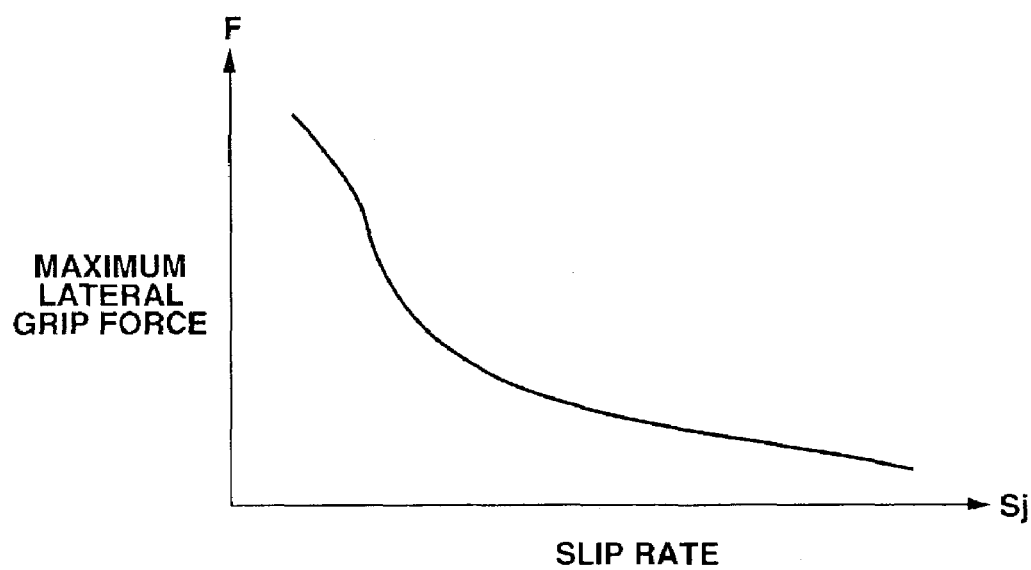
FIG. 5 is a preprogrammed characteristic map showing the relationship between a slip rate Sj and a maximum lateral grip force F.

More preferably, brake fluid pressure decrement ΔPdr may be set to increase, as the margin for a lateral grip force of each VDC noncontrolled wheel on the road decreases. Assuming that the VDC controlled wheel is connected to either one of front and rear wheel axles, the opposite-side road wheels, which are connected to the other wheel axle, correspond to the VDC noncontrolled wheels. As discussed above, on the assumption that the aforementioned brake fluid pressure decrement ΔPdr is determined or set based on the margin for lateral grip force of each VDC noncontrolled wheel on the road, slip rate Sj for each wheel is an important factor correlated to the margin for lateral grip force. Slip rate Sj is generally calculated from the following expression.

$$Sj=(VSP-Vwj)/VSP$$

where VSP is the vehicle speed detected by vehicle speed sensor 7 and Vwj is the wheel speed for each road wheel. Concretely, when the sign of yaw-moment controlled variable ΔM is positive and thus the VDC equipped 4WD is in the understeer suppression control mode, to estimate or derive the margin for lateral grip force of the VDC noncontrolled wheel, a maximum lateral grip force F, which can be generated at each of front-left and front-right wheels 1FL and 1FR (VDC noncontrolled wheels), is first calculated based on both the front-left and front-right wheel slip rates Sfl and Sfr (exactly, turning outside front and turning inside front wheel slip rates Sfo and Sfi). Conversely when the sign of yaw-moment controlled variable ΔM is negative and thus the VDC equipped 4WD is in the oversteer suppression control mode, to estimate or derive the margin for lateral grip force of the VDC noncontrolled wheel, a maximum lateral grip force F, which can be generated at each of rear-left and rear-right wheels 1RL and 1RR (VDC noncontrolled wheels), is first calculated based on both the rear-left and rear-right wheel slip rates Srl and Srr (exactly, turning outside rear and turning inside rear wheel slip rates Sfo and Sfi). In order to calculate or retrieve the maximum lateral grip force F, VDC controller 4 actually uses the preprogrammed slip rate Sj versus maximum lateral grip force F characteristic map of FIG. 5 showing how maximum lateral grip force F varies relative to slip rate Sj. The Sj–F characteristic map is correlated to tire characteristics of tires attached to the vehicular road wheels. As is generally known, a total grip force of the automotive vehicle is substantially identical to the sum of a longitudinal grip force and a lateral grip force. The longitudinal grip force of the wheel on the road in the fore and aft directions can be estimated based on both the braking force and slip rate Sj. Thus, an actual lateral grip force can be estimated based on the estimated longitudinal grip force. The previously-noted margin for lateral grip force of each VDC noncontrolled wheel on the road can be estimated as the difference between the maximum lateral grip force F retrieved from the preprogrammed Sj–F characteristic map and the actual lateral grip force estimated based on the braking force and slip rate Sj. In this case, an F–ΔPdr characteristic map has to be preprogrammed or predetermined, so that brake fluid pressure decrement ΔPdr increases as the estimated margin for lateral grip force of each VDC noncontrolled wheel on the road decreases. On the assumption that the differential motion between front and rear wheel axles is permanently limited by means of the differential mechanism incorporated in the VDC system equipped 4WD and thus the previously-discussed transferred braking force is present, the VDC system of the embodiment capable of executing the 1st brake fluid pressure compensation routine, operates as follows.

Figure 6:
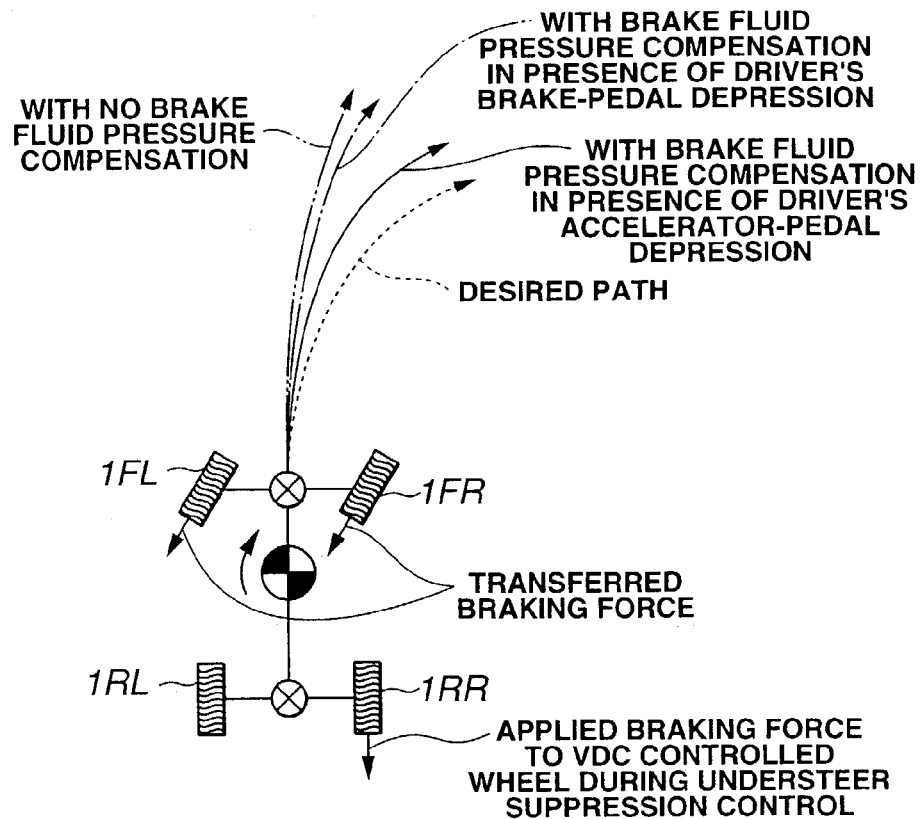
FIG. 6 is an explanatory view showing the operation of the VDC system of the embodiment under the understeer condition.

When the sign of yaw-moment controlled variable ΔM is positive during the right-hand turn and thus the VDC system equipped 4WD is in the understeer suppression control mode, according to the general VDC control routine that actual yaw rate φ is brought closer to desired yaw rate φ*, the braking force is applied to the rear-right road wheel 1RR (the VDC controlled wheel for understeer suppression). Under this condition, VDC controller 4 determines that the demand for yaw rate control is present (see step S1 of FIG. 2). At this time, if the vehicle is accelerating due to the driver's accelerator-pedal depression, the positive longitudinal acceleration αv of a comparatively great acceleration rate is read through step S2, and then a comparatively great rear wheel load Wr is calculated or retrieved based on the comparatively great positive longitudinal acceleration αv from the monotone increasing function Wr=f(αv) (see the αv–Wr characteristic map of FIG. 3 and step S3 of FIG. 2). Thereafter, brake fluid pressure correction value ΔPv for the VDC controlled wheel is calculated or retrieved from the Wr–ΔPv characteristic map of FIG. 4 (see step S4 of FIG. 2). In this case, brake fluid pressure correction value ΔPv is set to a comparatively great positive value. After this, according to the 1st brake fluid pressure compensation routine, a brake fluid pressure value $(Pri_{(n)}-|\Delta Pv|)$, obtained by subtracting the comparatively great positive brake fluid pressure correction value ΔPv from the current value $Pri_{(n)}$ of the reference value of turning inside rear wheel (VDC controlled wheel) brake fluid pressure Pri, is set to a new command value $Pri^*_{(new)}(=(Pri_{(n)}-|\Delta Pv|))$ for turning inside rear wheel brake fluid pressure Pri. As will be appreciated from the above, according to the VDC system of the embodiment capable of executing the 1st brake fluid pressure compensation routine of FIG. 2, in the presence of the driver's accelerator-pedal depression and when applying the braking force to the VDC controlled rear-right wheel 1RR during understeer suppression control on the right-hand turn with the limited differential motion between front and rear wheel axles, the applied braking force to VDC controlled rear-right wheel 1RR is decreasingly compensated for, as the increment of rear wheel load Wr, that is, the deviation (Wr–Wm) of the current value $Wr_{(n)}$ of rear wheel load Wr from ordinary rear wheel load value Wm increases, in other words, as the lateral-grip-force limit of each of VDC noncontrolled wheels (front wheels 1FL and 1FR) on the road decreases. Therefore, the transferred braking forces from the VDC controlled wheel (rear-right wheel 1RR) through the propeller shaft and the differential mechanism to the respective VDC noncontrolled wheels (front-left and front-right wheels 1FL ad 1FR) tend to reduce. This effectively prevents the lateral grip force of each VDC noncontrolled wheel on the road from decreasing undesirably. As a consequence, as can be appreciated from the vehicle-travel path indicated by the solid curved line in FIG. 6, by decreasingly compensating for the applied braking force to the VDC controlled wheel (rear-right wheel 1RR) in the presence of the driver's accelerator-pedal depression during understeer suppression control on the right-hand turn with the limited differential motion between front and rear wheel axles, it is possible to properly effectively suppress a drop in VDC-noncontrolled-wheel lateral grip force (i.e. a drop in the front-wheel lateral grip force) arising from the transferred braking force, thereby effectively suppressing understeer tendencies from developing undesirably. In FIG. 6, the rightmost curved broken line indicates a desired vehicle-travel path (i.e., neutral steer path or slight understeer path) during the right-hand turn.

If there is no brake fluid pressure compensation for the applied braking force to the rear-right road wheel 1RR (the VDC controlled wheel) during understeer suppression control on the right-hand turn with the limited differential motion between front and rear wheel axles when the increment of rear wheel load Wr is great, in other words, the lateral-grip-force limit of each of front wheels 1FL and 1FR (VDC noncontrolled wheels) on the road is small, for example during vehicle acceleration with the driver's accelerator-pedal depression, the transferred braking force acts on each VDC noncontrolled wheel. Undesirably, the transferred braking force exerts a bad influence on the lateral grip limit of the VDC noncontrolled wheel and as a result the lateral grip force of the VDC noncontrolled wheel falls. Therefore, it is impossible to effectively suppress undesired understeer tendencies from developing with no brake fluid pressure compensation for the applied braking force to rear-right road wheel 1RR (the VDC controlled wheel) during understeer suppression control on the right-hand turn with the limited differential motion (see the vehicle-travel path indicated by the leftmost two-dotted curved line in FIG. 6).

Thereafter, assuming that the brake pedal is depressed by the driver during subsequent executions of the 1st brake fluid pressure compensation routine of FIG. 2, the negative longitudinal acceleration $\alpha v$ of a deceleration rate is read through step S2, and then a comparatively small rear wheel load Wr is calculated or retrieved based on the negative longitudinal acceleration $\alpha v$ (the deceleration rate) from the monotone increasing function Wr=f($\alpha v$) (see the $\alpha v$–Wr characteristic map of FIG. 3 and step S3 of FIG. 2). And then, brake fluid pressure correction value $\Delta Pv$ is set to a negative value (see the Wr–$\Delta Pv$ characteristic map of FIG. 4 and step S4 of FIG. 2). After this, according to the 1st brake fluid pressure compensation routine, a brake fluid pressure value (Pri$_{(n)}$−(−|$\Delta Pv$|)=Pri$_{(n)}$+|$\Delta Pv$|), obtained by subtracting the negative brake fluid pressure correction value −|$\Delta Pv$| from the current value Pri$_{(n)}$ of the reference value of turning inside rear wheel (VDC controlled rear-right wheel 1RR) brake fluid pressure Pri, is set to a new command value Pri*$_{(new)}$(=(Pri$_{(n)}$+|$\Delta Pv$|)) for turning inside rear wheel brake fluid pressure Pri. As discussed above, according to the VDC system of the embodiment capable of executing the 1st brake fluid pressure compensation routine of FIG. 2, in the presence of the driver's brake-pedal depression while applying the braking force to VDC controlled rear-right wheel 1RR during understeer suppression control on the right-hand turn with the limited differential motion between front and rear wheel axles, the applied braking force to VDC controlled rear-right wheel 1RR, that is, turning inside rear wheel brake fluid pressure Pri is increasingly compensated for, as the decrement of rear wheel load Wr increases, that is, the increment of front wheel load Wf increases, in other words, as the lateral-grip-force limit of each VDC noncontrolled wheel (each of front wheels 1FL and 1FR) on the road increases. As a consequence, in the presence of the driver's brake-pedal depression while applying the braking force to the VDC controlled wheel (rear-right wheel 1RR) for understeer suppression control on the right-hand turn under a particular condition that the differential motion between front and rear wheel axles is limited, as can be appreciated from the vehicle-travel path indicated by the one-dotted curved line in FIG. 6, by properly increasingly compensating for the applied braking force to the VDC controlled wheel depending on the state of lateral grip of each VDC noncontrolled wheel on which the transferred braking force acts, it is possible to effectively suppress understeer tendencies from developing undesirably. In case of the 1st brake fluid pressure compensation routine of FIG. 2, the state of lateral grip of each VDC noncontrolled wheel on which the transferred braking force acts can be estimated based on rear wheel load Wr, in other words, front wheel load Wf. As set out above, the VDC system of the embodiment capable of executing the 1st brake fluid pressure compensation routine of FIG. 2, can properly compensate for the applied braking force to the VDC controlled wheel depending on the state of lateral grip of each VDC noncontrolled wheel on which the transferred braking force acts during vehicle dynamics control. Thus, it is possible to effectively prevent the sum of (i) the first braking force caused by the driver's brake-pedal depression and (ii) the second braking force (the transferred braking force) from exceeding a lateral-grip-force limit of each VDC noncontrolled wheel on the road, while continuously executing vehicle dynamics control (yaw rate control) with the limited differential motion between front and rear wheel axles. In addition to the above, by virtue of the flow from step S5 to S6 in FIG. 2, in the presence of the driver's brake-pedal depression during understeer suppression control, a brake fluid pressure value, obtained by subtracting brake fluid pressure decrement $\Delta Pdr$ from the current value of turning outside front wheel (VDC noncontrolled wheel) brake fluid pressure Pfo, calculated through step S4, is set to a new command value Pfo*$_{(new)}$. Simultaneously a brake fluid pressure value, obtained by subtracting brake fluid pressure decrement $\Delta Pdr$ from the current value of turning inside front wheel (VDC noncontrolled wheel) brake fluid pressure Pfi, calculated through step S4, is set to a new command value Pfi*$_{(new)}$. Therefore, even in the presence of application of the second braking force (the transferred braking force) as well as the first braking force caused by the driver's brake-pedal depression to each VDC noncontrolled wheel during understeer suppression control, it is possible to more effectively and reliably prevent the sum of the first and second braking forces from exceeding the lateral-grip-force limit of each VDC noncontrolled wheel on the road.

Figure 7:
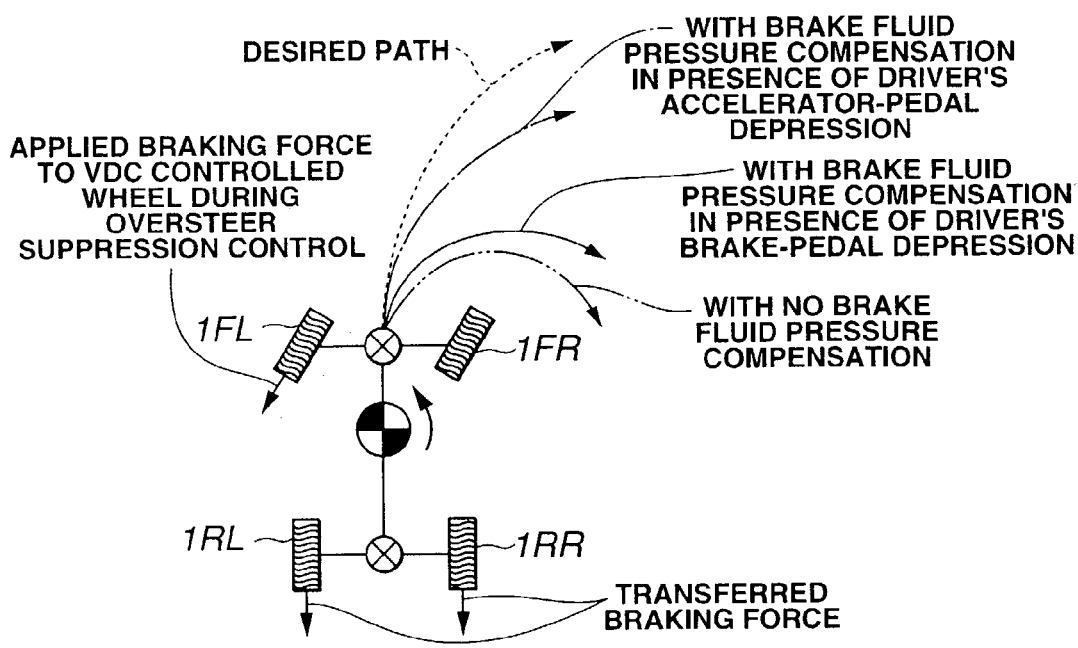
FIG. 7 is an explanatory view showing the operation of the VDC system of the embodiment under the oversteer condition.

On the contrary, when the sign of yaw-moment controlled variable $\Delta M$ is negative during the right-hand turn and thus the VDC system equipped 4WD is in the oversteer suppression control mode, according to the general VDC control routine that actual yaw rate $\phi$ is brought closer to desired yaw rate $\phi^*$, the braking force is applied to the front-left road wheel 1FL (the VDC controlled wheel for oversteer suppression). Under this condition, VDC controller 4 determines that the demand for yaw rate control is present (see step S1 of FIG. 2). At this time, if the vehicle is decelerating due to the driver's brake-pedal depression, the negative longitudinal acceleration $\alpha v$ having a certain deceleration rate is read through step S2, and then a comparatively small rear wheel load Wr is calculated or retrieved based on the negative longitudinal acceleration $\alpha v$ from the monotone increasing function Wr=f($\alpha v$) (see the $\alpha v$–Wr characteristic map of FIG. 3 and step S3 of FIG. 2). And then, brake fluid pressure correction value $\Delta Pv$ for the VDC controlled wheel is set to a negative value (see the Wr–$\Delta Pv$ characteristic map of FIG. 4 and step S4 of FIG. 2). After this, according to the 1st brake fluid pressure compensation routine, a brake fluid pressure value $(Pfo_{(n)}+(-|\Delta Pv|)=Pfo_{(n)}-|\Delta Pv|)$, obtained by adding the negative brake fluid pressure correction value $-|\Delta Pv|$ to the current value $Pfo_{(n)}$ of the reference value of turning outside front wheel (VDC controlled wheel) brake fluid pressure Pfo, is set to a new command value $Pfo_{(new)}$ $(=(Pfo_{(n)}-|\Delta Pv|))$ for turning outside front wheel brake fluid pressure Pfo. As will be appreciated from the above, according to the VDC system of the embodiment capable of executing the 1st brake fluid pressure compensation routine of FIG. 2, in the presence of the driver's brake-pedal depression when applying the braking force to the VDC controlled front-left wheel 1FL during oversteer suppression control on the right-hand turn with the limited differential motion between front and rear wheel axles, the applied braking force to VDC controlled front-left wheel 1FL, that is, turning outside front wheel brake fluid pressure Pfo is decreasingly compensated for, as the decrement of rear wheel load Wr increases, that is, the increment of front wheel load Wf increases, in other words, as the lateral-grip-force limit of each VDC noncontrolled wheel (each of rear wheels 1RL and 1RR) on the road decreases. Therefore, the transferred braking forces from the VDC controlled wheel (front-left wheel 1FL) through the propeller shaft and the differential mechanism to the respective VDC noncontrolled wheels (rear-left and rear-right wheels 1RL ad 1RR) tend to reduce. This effectively prevents the lateral grip force of each VDC noncontrolled wheel on the road from decreasing undesirably. As a consequence, as can be appreciated from the vehicle-travel path indicated by the solid curved line in FIG. 7, by decreasingly compensating for the applied braking force to the VDC controlled wheel (front-left wheel 1FL) in the presence of the driver's brake-pedal depression during oversteer suppression control on the right-hand turn with the limited differential motion between front and rear wheel axles, it is possible to properly effectively suppress a drop in VDC-noncontrolled-wheel lateral grip force (i.e., a drop in the rear-wheel lateral grip force) arising from the transferred braking force, thus effectively suppressing oversteer tendencies from developing undesirably. In FIG. 7, the leftmost curved broken line indicates a desired vehicle-travel path (i.e., neutral steer path or weak understeer path) during the right-hand turn.

If there is no brake fluid pressure compensation for the applied braking force to the front-left road wheel 1FL (the VDC controlled wheel) during oversteer suppression control on the right-hand turn with the limited differential motion between front and rear wheel axles when the decrement of rear wheel load Wr is great, in other words, the lateral-grip-force limit of each of rear wheels 1RL and 1RR (VDC noncontrolled wheels) on the road is small, for example during vehicle deceleration with the driver's brake-pedal depression, the transferred braking force acts on each VDC noncontrolled wheel. Undesirably, the transferred braking force exerts a bad influence on the lateral grip limit of the VDC noncontrolled wheel and as a result the lateral grip force of the VDC noncontrolled wheel falls. Therefore, it is impossible to effectively suppress undesired oversteer tendencies from developing with no brake fluid pressure compensation for the applied braking force to front-left road wheel 1FL (the VDC controlled wheel) during oversteer suppression control on the right-hand turn with the limited differential motion (see the vehicle-travel path indicated by the rightmost two-dotted curved line in FIG. 7).

Thereafter, assuming that the accelerator pedal is depressed by the driver during subsequent executions of the 1st brake fluid pressure compensation routine of FIG. 2, the positive longitudinal acceleration $\alpha v$ of a comparatively great acceleration rate is read through step S2, and then a comparatively great rear wheel load Wr is calculated or retrieved based on the positive longitudinal acceleration $\alpha v$ of the comparatively great acceleration rate from the monotone increasing function $Wr=f(\alpha v)$ (see the $\alpha v$–Wr characteristic map of FIG. 3 and step S3 of FIG. 2). Thereafter, brake fluid pressure correction value $\Delta Pv$ is set to a comparatively great positive value (see the Wr–$\Delta Pv$ characteristic map of FIG. 4 and step S4 of FIG. 2). After this, according to the 1st brake fluid pressure compensation routine, a brake fluid pressure value $(Pfo_{(n)}+|\Delta Pv|)$, obtained by adding the comparatively great positive brake fluid pressure correction value $\Delta Pv$ to the current value $Pfo_{(n)}$ of the reference value of turning outside front wheel (VDC controlled front-left wheel 1FL) brake fluid pressure Pfo, is set to a new command value $Pfo^*_{(new)}(=(Pfo_{(n)}+|\Delta Pv|))$ for turning outside front wheel brake fluid pressure Pfo. As will be appreciated from the above, according to the VDC system of the embodiment capable of executing the 1st brake fluid pressure compensation routine of FIG. 2, in the presence of the driver's accelerator-pedal depression when applying the braking force to VDC controlled front-left wheel 1FL during oversteer suppression control on the right-hand turn with the limited differential motion between front and rear wheel axles, the applied braking force to VDC controlled front-left wheel 1FL, that is, turning outside front wheel brake fluid pressure Pfo is increasingly compensated for, as the increment of rear wheel load Wr increases, in other words, as the lateral-grip-force limit of each VDC noncontrolled wheel (each of rear wheels 1RL and 1RR) on the road increases. As a consequence, in the presence of the driver's accelerator-pedal depression while applying the braking force to the VDC controlled wheel (front-left wheel 1FL) for oversteer suppression control on the right-hand turn under a particular condition that the differential motion between front and rear wheel axles is limited, as can be appreciated from the vehicle-travel path indicated by the one-dotted curved line in FIG. 7, by properly increasingly compensating for the applied braking force to the VDC controlled wheel depending on the state of lateral grip of each VDC noncontrolled wheel on which the transferred braking force acts, it is possible to effectively suppress oversteer tendencies from developing undesirably. The VDC system of the embodiment utilizes a sensor signal value (longitudinal acceleration $\alpha v$) from longitudinal G sensor 9 to estimate or detect the lateral-grip state of each VDC noncontrolled wheel on which the transferred braking force acts, during understeer suppression control or oversteer suppression control. The lateral-grip state is correlated to a fore-and-aft load shift between front and rear ends of the vehicle, and estimated by rear wheel load Wr in the 1st brake fluid pressure compensation routine of FIG. 2. To more precisely detect or sense the lateral-grip state (estimated by rear wheel load Wr at step S3 of FIG. 2) of each VDC noncontrolled wheel the rear wheel load Wr, it is preferable to use a pendulous integrating gyro accelerometer as longitudinal G sensor 9, since the pendulous integrating gyro accelerometer is suitable for various vehicle driving states, for example during uphill or downhill driving, that is when the fore-and-aft load shift occurs due to a change of a road-surface gradient.

Figure 8:
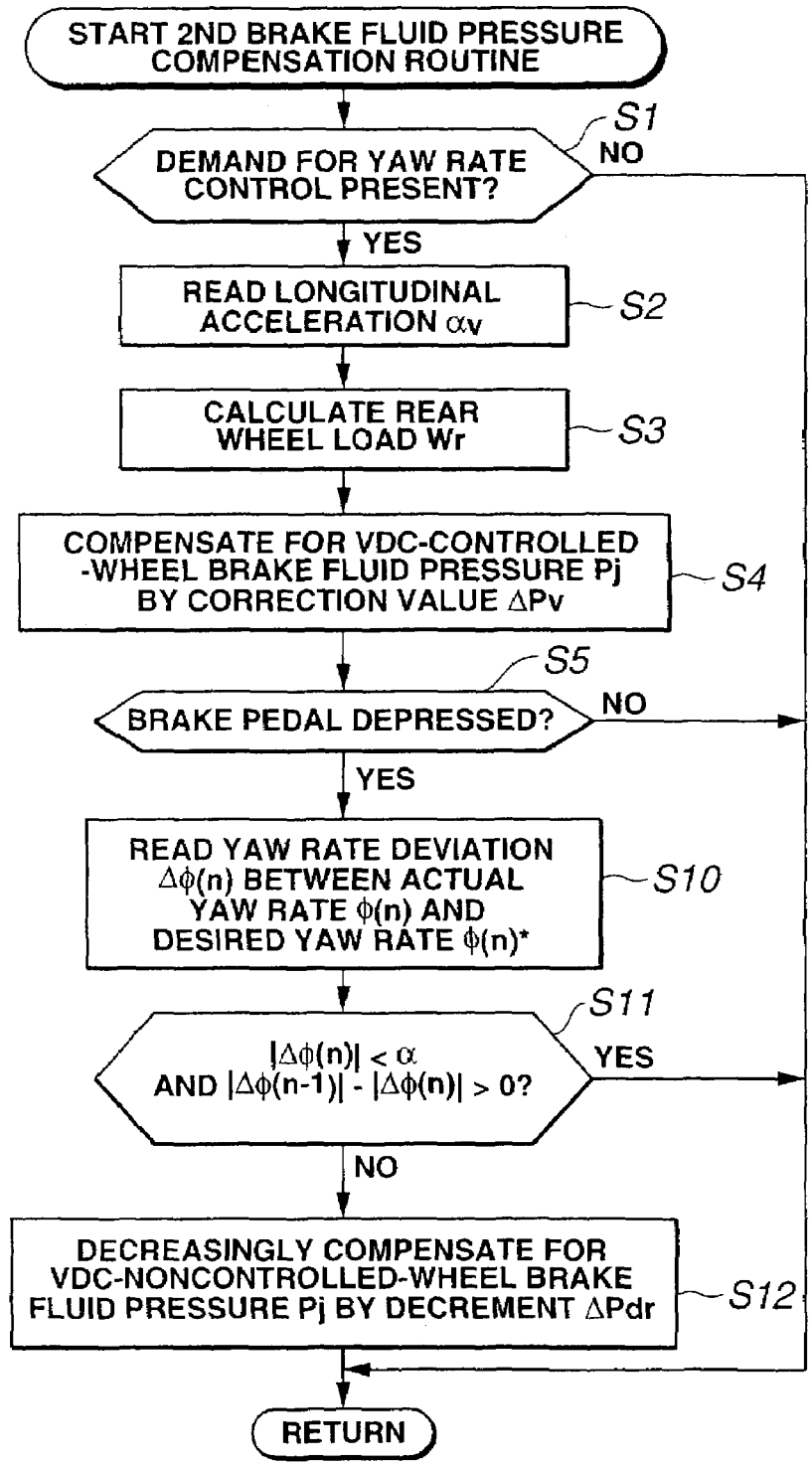
FIG. 8 is a flow chart illustrating a second brake fluid pressure compensation routine executed within the processor of the electronic control unit incorporated in the VDC system of the embodiment.

Referring now to FIG. 8, there is shown the 2nd brake fluid pressure compensation routine, executed during vehicle dynamics control (yaw rate control) and somewhat modified from the 1st brake fluid pressure compensation routine of FIG. 2. The 2nd brake fluid pressure compensation routine shown in FIG. 8 is also executed as time-triggered interrupt routines to be triggered every predetermined sampling time intervals ΔT such as 10 milliseconds. The 2nd routine of FIG. 8 is similar to the 1st routine of FIG. 2, except that step S6 included in the 1st routine shown in FIG. 2 is replaced with steps S10, S11 and S12 included in the 2nd routine shown in FIG. 8. Thus, the same step numbers used to designate steps in the 1st routine shown in FIG. 2 will be applied to the corresponding step numbers used in the 2nd routine shown in FIG. 8, for the purpose of comparison of the two different interrupt routines. Steps S10, S11 and S12 will be hereinafter described in detail with reference to the accompanying drawings, while detailed description of steps S1 through S5 will be omitted because the above description thereon seems to be self-explanatory.

At step S10, the current value $\Delta\phi_{(n)}$ of yaw rate deviation $\Delta\phi$ between the current value $\phi_{(n)}$ of actual yaw rate $\phi$ (monitored by yaw rate sensor 8) and the current value $\phi_{(n)}^*$ of desired yaw rate $\phi^*$ is read and then an absolute value $|\Delta\phi_{(n)}|$ of the current value $\Delta\phi_{(n)}$ of yaw rate deviation $\Delta\phi$ is calculated.

At step S11, a check is made to determine whether the absolute value $|\Delta\phi_{(n)}|$ of the current value $\Delta\phi_{(n)}$ of yaw rate deviation $\Delta\phi$ becomes less than a predetermined yaw-rate-deviation threshold value $\alpha$ (that is, the first condition defined by $|\Delta\phi_{(n)}|<\alpha$ is satisfied), and additionally the maximal value of the function $|\Delta\phi|=f(t)$, which indicates a change in the absolute value $|\Delta\phi|$ of yaw rate deviation $\Delta\phi$ with respect to t (time), has been reached and thus the absolute value $|\Delta\phi|$ of yaw rate deviation $\Delta\phi$ tends to decrease (that is, the second condition defined by $(|\Delta\phi_{(n-1)}|-|\Delta\phi_{(n)}|)>0$ is satisfied). In the inequality $(|\Delta\phi_{(n-1)}|-|\Delta\phi_{(n)}|)>0$, $|\Delta\phi_{(n-1)}|$ means the absolute value $|\Delta\phi_{(n-1)}|$ of the previous yaw rate deviation $\Delta\phi_{(n-1)}$, calculated one cycle before with respect to the current execution cycle of the 2nd routine of FIG. 8. When the answer to step S11 is in the affirmative (YES) and thus the first $(|\Delta\phi_{(n)}|<\alpha)$ and second $(|\Delta\phi_{(n-1)}|-|\Delta\phi_{(n)}|>0)$ conditions are simultaneously satisfied, the program exits this subroutine and returns to the main yaw-rate-control program. Conversely when the answer to step S11 is in the negative (NO) and thus at least one of the first $(|\Delta\phi_{(n)}|<\alpha)$ and second $(|\Delta\phi_{(n-1)}|-|\Delta\phi_{(n)}|>0)$ conditions is unsatisfied, the routine proceeds from step S11 to step S12. Step S12 of the 2nd routine shown in FIG. 8 is similar to step S6 of the 1st routine shown in FIG. 2.

At step S12, when the sign of yaw-moment controlled variable ΔM obtained by the yaw-moment controlled variable ΔM arithmetic processing of FIG. 10 (described later) is positive, that is, during the understeer suppression control mode, a brake fluid pressure value, obtained by subtracting a brake fluid pressure decrement ΔPdr from the current value of turning outside front wheel (VDC noncontrolled wheel) brake fluid pressure Pfo, calculated through step S4, is set to a new command value for turning outside front wheel brake fluid pressure Pfo. At the same time, a brake fluid pressure value, obtained by subtracting brake fluid pressure decrement ΔPdr from the current value of turning inside front wheel (VDC noncontrolled wheel) brake fluid pressure Pfi, calculated through step S4, is set to a new command value for turning inside front wheel brake fluid pressure Pfi. In a similar manner, when the sign of yaw-moment controlled variable ΔM is negative, that is, during the oversteer suppression control mode, a brake fluid pressure value, obtained by subtracting brake fluid pressure decrement ΔPdr from the current value of turning outside rear wheel (VDC noncontrolled wheel) brake fluid pressure Pro, calculated through step S4, is set to a new command value for turning outside rear wheel brake fluid pressure Pro. At the same time, a brake fluid pressure value, obtained by subtracting brake fluid pressure decrement ΔPdr from the current value of turning inside rear wheel (VDC noncontrolled wheel) brake fluid pressure Pri, calculated through step S4, is set to a new command value for turning inside rear wheel brake fluid pressure Pri.

Figure 9:
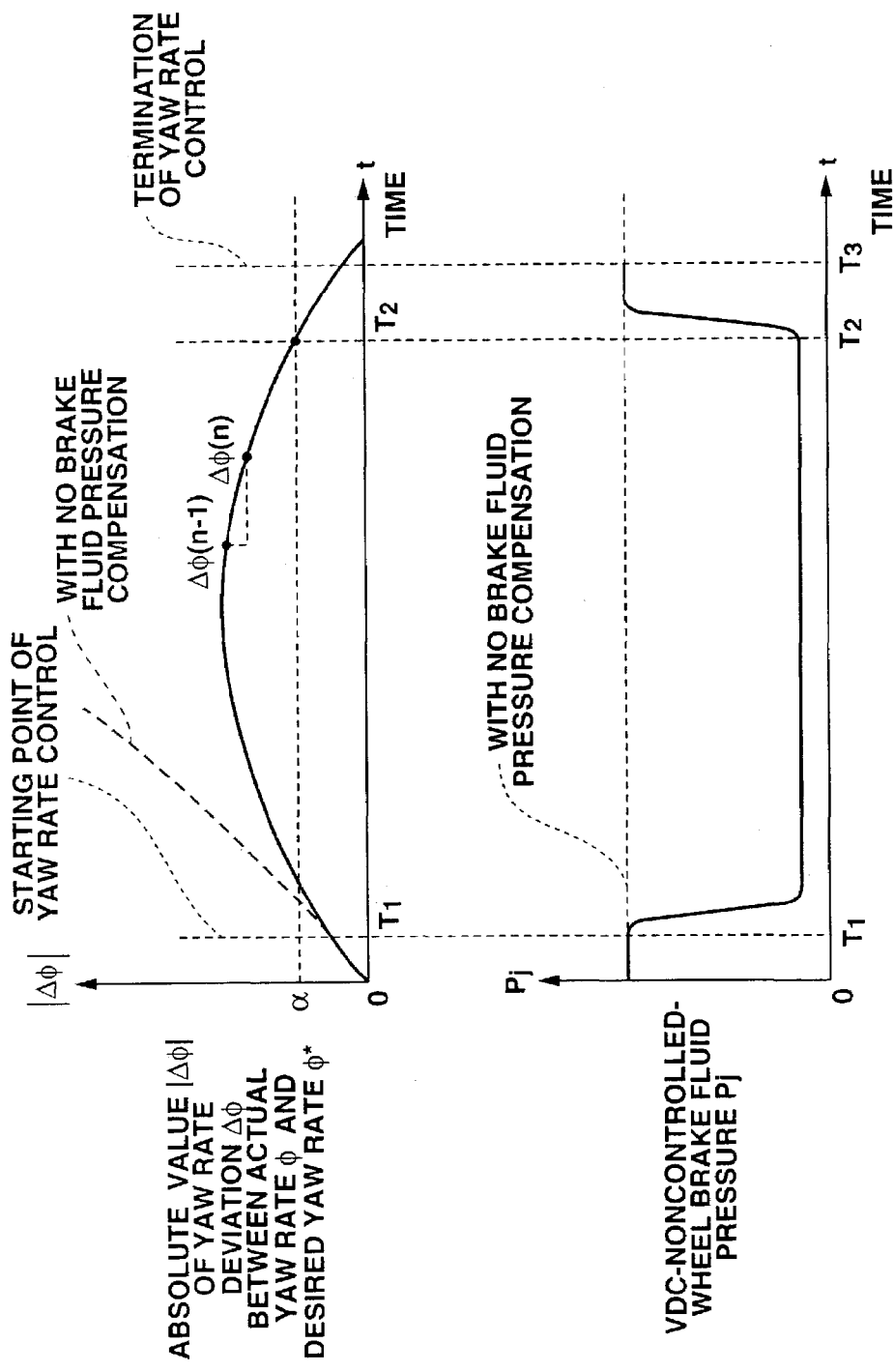
FIG. 9A is a timing chart showing a change in an absolute value $|\Delta\phi|(=|\phi-\phi^*|)$ of a yaw rate deviation $\Delta\phi$ between an actual yaw rate $\phi$ and a desired yaw rate $\phi^*$, obtained by the system executing the second brake fluid pressure compensation routine of FIG. 8.
FIG. 9B is a timing chart showing a change in a brake fluid pressure Pj applied to each VDC noncontrolled wheel during operation of the system executing the second brake fluid pressure compensation routine of FIG. 8.

As can be appreciated from a series of steps S10, S11 and S12, when, during vehicle dynamics control, the deviation $\Delta\phi$ of the actual yaw rate from the desired yaw rate has been reduced and as a result the absolute value $|\Delta\phi|$ of yaw rate deviation $\Delta\phi$ has already been converged to a value closer to zero (see a rapid rise in the VDC-noncontrolled-wheel brake fluid pressure from the time T2 of FIG. 9B and the yaw-rate-deviation absolute value $|\Delta\phi|$ becoming below $\alpha$ from the time T2 of FIG. 9A), the VDC controller operates to terminate or inhibit the VDC-noncontrolled-wheel brake fluid pressure reduction control mode (i.e., the opposite-side wheel brake fluid pressure reduction control mode executed through step S12 of FIG. 8) during which the VDC-noncontrolled-wheel braking force is reduced by an excess of the sum of (i) the first braking force applied to each VDC noncontrolled wheel by the driver's brake-pedal depression and (ii) the second braking force (the transferred braking force) over the lateral-grip-force limit of each VDC noncontrolled wheel on the road. In FIGS. 9A and 9B, the time T1 means a starting point of yaw rate control (vehicle dynamics control). In the vehicle dynamics control system of the embodiment capable of the 1st (see FIG. 2) or 2nd (see FIG. 8) brake fluid pressure compensation routine, yaw rate sensor 8 functions as a turning-behavior state variable detection means that detects the state variable of the turning behavior of the VDC system equipped 4WD. Step S3 of FIGS. 2 and 8 functions as a lateral-grip state detection means that detects or estimates the state of lateral grip of the VDC noncontrolled wheel on the road. Step S4 of FIGS. 2 and 8 functions as a VDC-controlled-wheel braking force compensation means that compensates for the braking force of the VDC controlled wheel itself.

Figure 10:
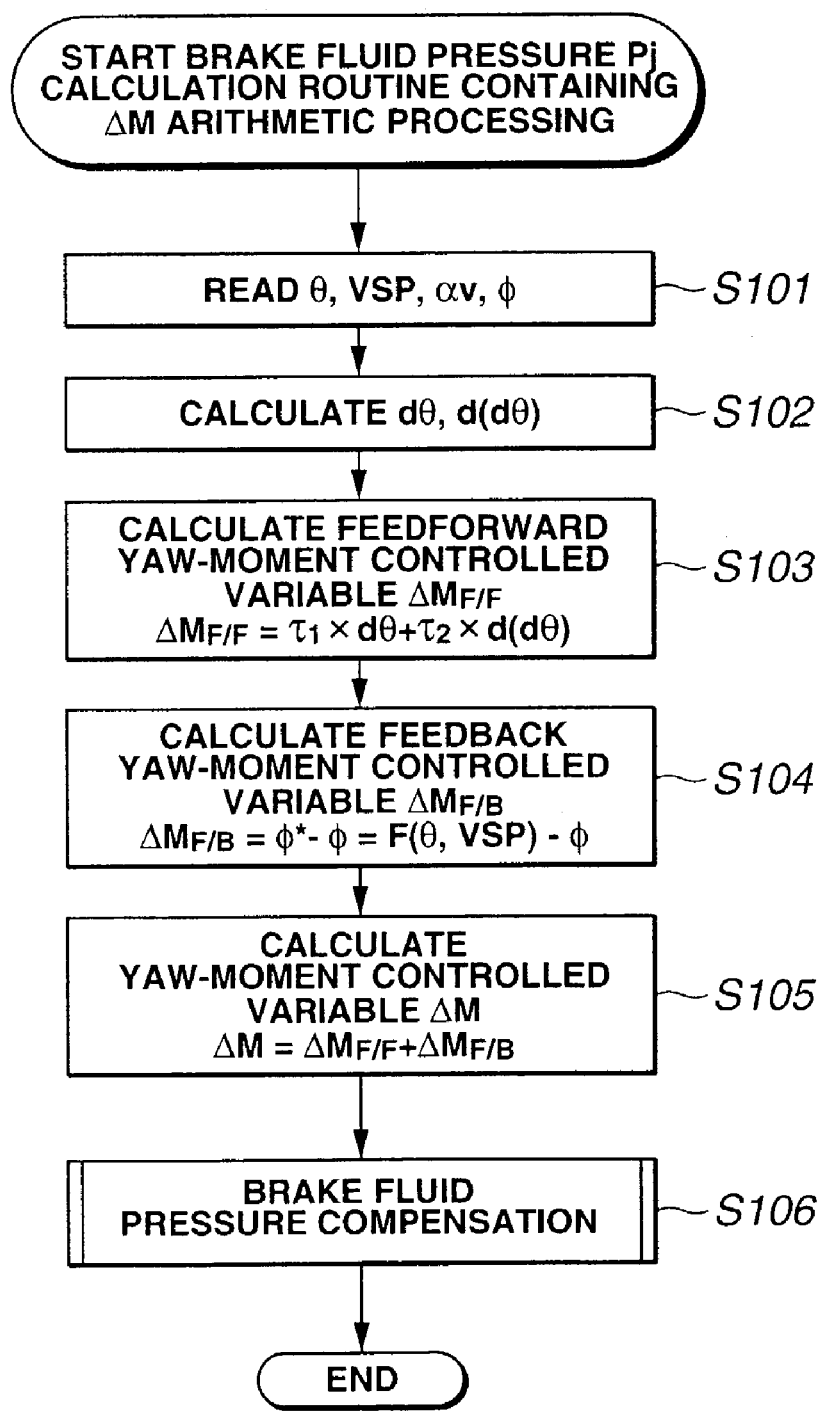
FIG. 10 is a flow chart relating to a brake fluid pressure Pj arithmetic calculation routine containing a yaw-moment controlled variable ΔM arithmetic processing, executed within the processor of the electronic control unit incorporated in the VDC system of the embodiment.

Referring now to FIG. 10, there is shown the brake fluid pressure Pj arithmetic calculation routine containing a yaw-moment controlled variable ΔM arithmetic processing, executed within the processor of VDC controller 4 incorporated in the VDC system of the embodiment. The sub-routine of FIG. 10 is executed as time-triggered interrupt routines to be triggered every predetermined sampling time intervals ΔT such as 10 milliseconds. According to the subroutine of FIG. 10, a yaw-moment controlled variable ΔM is arithmetically calculated so that actual yaw rate $\phi$ is brought closer to desired yaw rate $\phi^*$. And then, reference values of turning outside front, turning inside front, turning outside rear, and turning inside rear brake fluid pressures Pfo, Pfi, Pro, and Pri, which are calculated by the general VDC control routine in a manner so as to achieve the yaw-moment controlled variable ΔM, are suitably compensated for according to either one of the pressure compensation subroutines shown in FIGS. 2, 8, 11, and 14.

At step S101 of FIG. 10, steer angle θ, vehicle speed VSP, longitudinal acceleration αv, and actual yaw rate $\phi$ are read.

At step S102, first, a steer angular velocity dθ, which is the time rate of change of steer angle θ, is arithmetically calculated based on steer angle θ read through step S101. Then, a steer angular acceleration d(dθ), which is the time rate of change of steer angular velocity dθ, is calculated. Concretely, steer angular velocity dθ is calculated as a derived function f'(θ) of first order of steer angle θ by means of a high pass filter or the like. Similarly, steer angular acceleration d(dθ) is calculated as a derived function f''(θ) of second order of steer angle θ.

At step S103, a feedforward yaw-moment controlled variable $\Delta M_{F/F}$ is calculated based on both steer angular velocity dθ and steer angular acceleration d(dθ), from the following expression.

$$\Delta M_{F/F} = \tau_1 \times d\theta + \tau_2 \times d(d\theta)$$

where $\tau_1$ denotes a control gain of steer angular velocity dθ, and $\tau_2$ denotes a control gain of steer angular acceleration d(dθ).

At step S104, a feedback yaw-moment controlled variable $\Delta M_{F/B}$ is calculated as the difference (φ*−φ) between desired yaw rate φ* (estimated based on both vehicle speed VSP and steer angle θ and thus represented as a function F(θ, VSP)) and actual yaw rate φ, from the following expression.

$$\Delta M_{F/B} = \phi^* - \phi = F(\theta, VSP) - \phi$$

At step S105, yaw-moment controlled variable ΔM is calculated as the sum of feedforward yaw-moment controlled variable $\Delta M_{F/F}$ and feedback yaw-moment controlled variable $\Delta M_{F/B}$ as follows.

$$\Delta M = \Delta M_{F/F} + \Delta M_{F/B}$$

That is to say, in the shown embodiment, feedforward control and feedback control are properly combined with each other to realize a more suitable yaw-moment controlled variable ΔM (=$\Delta M_{F/F}+\Delta M_{F/B}$) and thus to avoid or prevent undesired oscillation (undesired undershoot and overshoot) of the VDC system so that actual yaw rate φ is brought closer to desired yaw rate φ* without any undesired oscillation. After a series of steps S101–S105, the routine proceeds to step S106.

At step S106, the brake fluid pressure compensation subroutine, as shown in FIGS. 2, 8, 11 or 14, is initiated to compensate for the command signal indicative of the VDC-noncontrolled-wheel brake fluid pressure as well as the command signal indicative of the VDC-controlled-wheel brake fluid pressure. Thereafter, the program exits this subroutine and returns to the main program.

Figure 11:
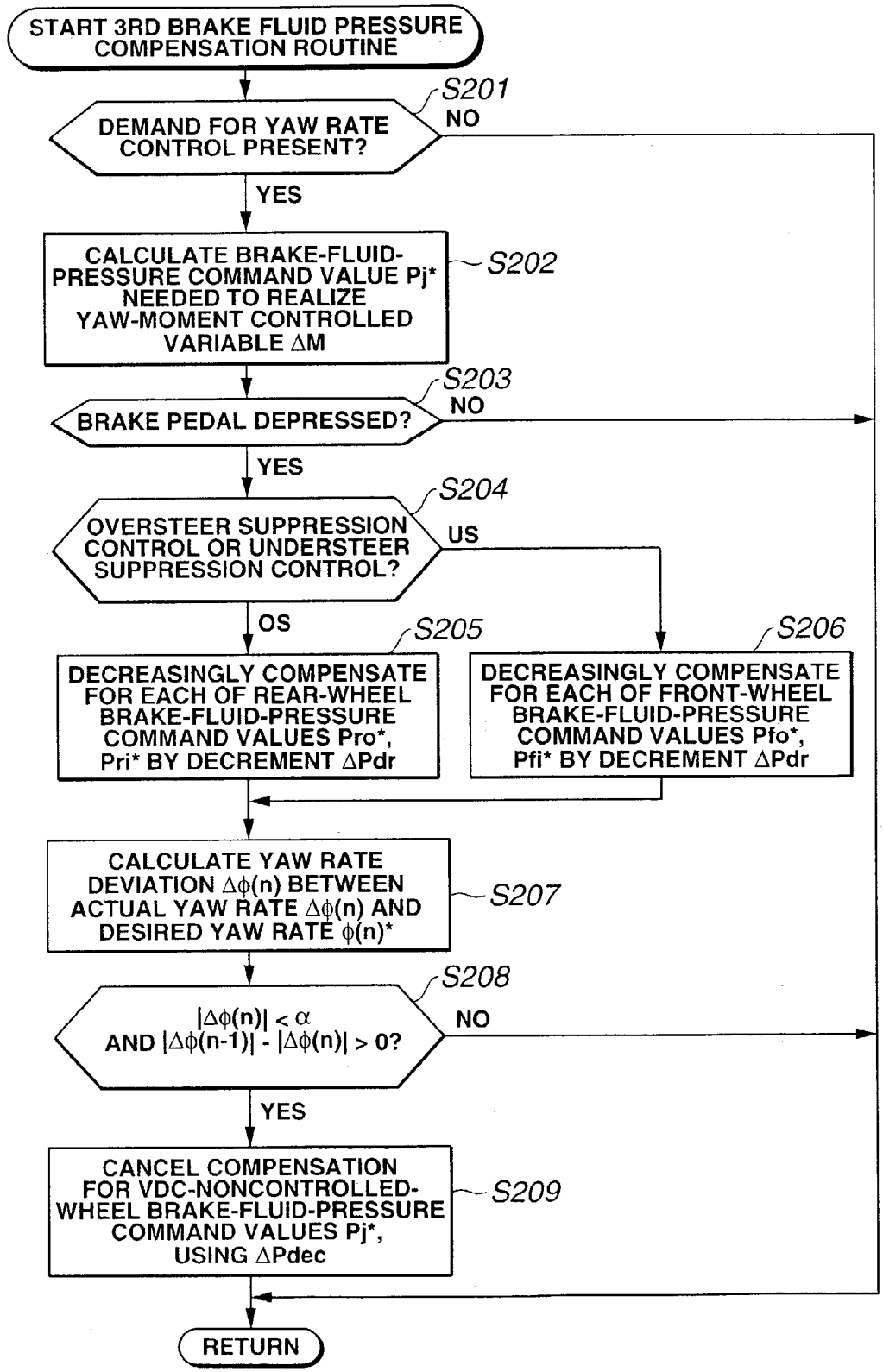
FIG. 11 is a flow chart illustrating details of a third brake fluid pressure compensation routine, executed within the processor of the electronic control unit incorporated in the VDC system of the embodiment, when the brake pedal is depressed by the driver during the VDC operating mode.

Referring now to FIG. 11, there is shown the 3rd brake fluid pressure compensation routine, executed during vehicle dynamics control (yaw rate control), taking into account the driver's brake-pedal depression. The 3rd brake fluid pressure compensation routine shown in FIG. 11 is also executed as time-triggered interrupt routines to be triggered every predetermined sampling time intervals ΔT such as 10 milliseconds.

At step S201, a check is made to determine, based on yaw-moment controlled variable ΔM obtained by the yaw-moment controlled variable ΔM arithmetic processing of FIG. 10, whether a demand for yaw rate control is present or absent. When the absolute value |ΔM| of yaw-moment controlled variable ΔM (=$\Delta M_{F/F}+\Delta M_{F/B}$) is greater than "0", that is, |ΔM|>0, or when VDC off switch 12 is turned OFF to enable the yaw rate control function, VDC controller 4 determines that the demand for yaw rate control is present. As discussed above, when the answer to step S201 is affirmative (YES), the routine proceeds to step S202. Conversely when |ΔM|≦0 or when VDC off switch 12 is turned ON to disable the yaw rate control function, VDC controller 4 determines that the demand for yaw rate control is absent. That is, when the answer to step S201 is negative (NO), the program exits this subroutine and returns to the main program.

At step S202, a braking force applied to each road wheel is calculated in such a manner as to realize yaw-moment controlled variable ΔM, and then a command value Pj* of the brake fluid pressure of each wheel is calculated. In a similar manner to the 1st and 2nd subroutines of FIGS. 2 and 8, in the VDC system of the shown embodiment capable of the 3rd routine of FIG. 11, to suppress oversteer tendencies during vehicle dynamics control, a braking force is applied to only the outside front wheel (VDC controlled wheel) in the turn. In contrast, to suppress understeer tendencies during vehicle dynamics control, a braking force is applied to only the inside rear wheel (VDC controlled wheel) in the turn.

At step S203, a check is made to determine, based on the signal from brake switch 10, whether the driver depresses brake pedal 3. In the presence of the driver's brake-pedal depression during vehicle dynamics control (yaw rate control), the routine proceeds from step S203 to step S204. Conversely in the absence of the driver's brake-pedal depression during vehicle dynamics control, the program exits this subroutine and returns to the main program. The state of the driver's brake-pedal depression is detected by brake switch 10. In lieu thereof, master-cylinder pressure Pm, which is sensed by master-cylinder pressure sensor 11, may be used. In this case, when master-cylinder pressure Pm exceeds a predetermined threshold value, VDC controller 4 determines that the driver's brake-pedal depression is present.

At step S204, a check is made to determine, based on the sign of yaw-moment controlled variable ΔM, if the VDC system equipped 4WD is in an understeer suppression control mode (that is, in case that the sign of yaw-moment controlled variable ΔM is positive) or in an oversteer suppression control mode (that is, in case that the sign of yaw-moment controlled variable ΔM is negative). When the VDC equipped 4WD is in the oversteer suppression control mode, the routine proceeds from step S204 to step S205. Conversely when the VDC equipped 4WD is in the understeer suppression control mode, the routine proceeds from step S204 to step S206.

At step S205, in the oversteer suppression control mode, a brake fluid pressure value, obtained by subtracting brake fluid pressure decrement ΔPdr from the current value of turning outside rear wheel (VDC noncontrolled wheel) brake fluid pressure Pro, estimated by master-cylinder pressure Pm, is set to a new command value Pro*$_{(new)}$ for turning outside rear wheel brake fluid pressure Pro. At the same time, a brake fluid pressure value, obtained by subtracting brake fluid pressure decrement ΔPdr from the current value of turning inside rear wheel (VDC noncontrolled wheel) brake fluid pressure Pri, estimated by master-cylinder pressure Pm, is set to a new command value Pri*$_{(new)}$ for turning inside rear wheel brake fluid pressure Pri. That is, the new command values Pro*$_{(new)}$ and Pri*$_{(new)}$ are represented as follows.

$$Pro^*_{(new)} = Pro^*_{(n)} = Pro^*_{(n-1)} - \Delta Pdr$$

$$Pri^*_{(new)} = Pri^*_{(n)} = Pri^*_{(n-1)} - \Delta Pdr$$

In the presence of the driver's brake-pedal depression during oversteer suppression control on the right-hand turn with the limited differential motion between front and rear wheel axles, in the system executing the 3rd routine of FIG. 11, brake fluid pressure decrement ΔPdr for each VDC noncontrolled wheel (each of rear wheels 1RL, 1RR) is set to 15% of the command value Pj* (exactly, Pfo* calculated through step S202) of brake fluid pressure Pfo for turning outside front wheel (VDC controlled wheel) Alternatively, brake fluid pressure decrement ΔPdr for each VDC noncontrolled wheel (each of rear wheels 1RL, 1RR) may be set to the other percentage of brake-fluid-pressure command value Pfo* for turning outside front wheel (VDC controlled wheel), such as 50%. In lieu thereof, brake fluid pressure decrement ΔPdr for each VDC noncontrolled wheel (each of rear wheels 1RL, 1RR) may be set, taking into account the optimal lateral grip, optimal lateral grip force, or optimal slip rate ranging from 10% to 20%. In such a case, it is possible to satisfying the driver's braking requirement, while effectively preventing the sum of (i) the first braking force caused by the driver's brake-pedal depression and (ii) the second braking force (the transferred braking force) from exceeding a lateral-grip-force limit of each rear wheel (each VDC noncontrolled wheel) on the road, and continuously executing vehicle dynamics control (oversteer suppression control) with the limited differential motion between front and rear wheel axles.

At step S206, in the understeer suppression control mode, a brake fluid pressure value, obtained by subtracting brake fluid pressure decrement ΔPdr from the current value of turning outside front wheel (VDC noncontrolled wheel) brake fluid pressure Pfo, estimated by master-cylinder pressure Pm, is set to a new command value Pfo*$_{(new)}$ for turning outside front wheel brake fluid pressure Pfo. At the same time, a brake fluid pressure value, obtained by subtracting brake fluid pressure decrement ΔPdr from the current value of turning inside front wheel (VDC noncontrolled wheel) brake fluid pressure Pfi, estimated by master-cylinder pressure Pm, is set to a new command value Pfi*$_{(new)}$ for turning inside front wheel brake fluid pressure Pfi. That is, the new command values Pfo*$_{(new)}$ and Pfi*$_{(new)}$ are represented as follows.

$$Pfo^*_{(new)} = Pfo^*_{(n)} = Pfo^*_{(n-1)} - \Delta Pdr$$

$$Pfi^*_{(new)} = Pfi^*_{(n)} = Pfi^*_{(n-1)} - \Delta Pdr$$

Through step S206, in the presence of the driver's brake-pedal depression during understeer suppression control on the right-hand turn with the limited differential motion between front and rear wheel axles, in the system executing the 3rd routine of FIG. 11, brake fluid pressure decrement ΔPdr for each VDC noncontrolled wheel (each of front wheels 1FL, 1FR) is set to 35% of the command value Pj* (exactly, Pri* calculated through step S202) of brake fluid pressure Pri for turning inside rear wheel (VDC controlled wheel). Alternatively, brake fluid pressure decrement ΔPdr for each VDC noncontrolled wheel (each of front wheels 1FL, 1FR) may be set to the other percentage of brake-fluid-pressure command value Pri* for turning inside rear wheel (VDC controlled wheel), such as 50%. In lieu thereof, brake fluid pressure decrement ΔPdr for each VDC noncontrolled wheel (each of front wheels 1FL, 1FR) may be set, taking into account the optimal lateral grip, optimal lateral grip force, or optimal slip rate ranging from 10% to 20%. In such a case, it is possible to satisfying the driver's braking requirement, while effectively preventing the sum of (i) the first braking force caused by the driver's brake-pedal depression and (ii) the second braking force (the transferred braking force) from exceeding a lateral-grip-force limit of each front wheel (each VDC noncontrolled wheel) on the road, and continuously executing vehicle dynamics control (understeer suppression control) with the limited differential motion between front and rear wheel axles.

At step S207, in a similar manner to step S10 of FIG. 8, the current value Δφ$_{(n)}$ of yaw rate deviation Δφ between the current value φ$_{(n)}$ of actual yaw rate φ (monitored by yaw rate sensor 8) and the current value φ$_{(n)}$* of desired yaw rate φ* is read and then an absolute value |Δφ$_{(n)}$| of the current value Δφ$_{(n)}$ of yaw rate deviation Δφ is calculated.

At step S208, a check is made to determine whether the absolute value |Δφ$_{(n)}$| of the current value Δφ$_{(n)}$ of yaw rate deviation Δφ becomes less than a predetermined yaw-rate-deviation threshold value α (that is, the first condition defined by |Δφ$_{(n)}$|<α a is satisfied), and additionally the maximal value of the function |Δφ|=f(t), which indicates a change in the absolute value |Δφ| of yaw rate deviation Δφ with respect to t (time), has been reached and thus the absolute value |Δφ| of yaw rate deviation Δφ tends to decrease (that is, the second condition defined by (|Δφ$_{(n-1)}$|−|Δφ$_{(n)}$|)>0 is satisfied). In the inequality (|Δφ$_{(n-1)}$|−|Δφ$_{(n)}$|)>0, |Δφ$_{(n-1)}$| means the absolute value |Δφ$_{(n-1)}$| of the previous yaw rate deviation Δφ$_{(n-1)}$, calculated one cycle before with respect to the current execution cycle of the 3rd routine of FIG. 11. When the answer to step S208 is in the affirmative (YES) and thus the first (|Δφ$_{(n)}$|<α) and second (|Δφ$_{(n-1)}$|−|Δφ$_{(n)}$|>0) conditions are simultaneously satisfied, the routine proceeds from step S208 to step S209. Conversely when the answer to step S208 is in the negative (NO) and thus at least one of the first (|Δφ$_{(n)}$|<α) and second (|Δφ$_{(n-1)}$|−|Δφ$_{(n)}$|>0) conditions is unsatisfied, the program exits this subroutine and returns to the main yaw-rate-control program. Satisfying both the first (|Δφ$_{(n)}$|<α) and second (|Δφ$_{(n-1)}$|−|Δφ$_{(n)}$|>0) conditions means yaw rate deviation Δφ is decreasing and adequately small, in other words, the margin for lateral grip of the wheel on the road has already been recovered and increased properly.

At step S209, in the oversteer suppression control mode, a brake fluid pressure value, obtained by adding a pressure-reduction-mode cancel correction value ΔP$_{dec}$ to the current value of the command value Pro* (calculated through step S205) of turning outside rear wheel (VDC noncontrolled wheel) brake fluid pressure Pro, is set to a new command value Pro*$_{(new)}$. At the same time, a brake fluid pressure value, obtained by adding pressure-reduction-mode cancel correction value ΔP$_{dec}$ to the current value of the command value Pri* (calculated through step S205) of turning inside rear wheel (VDC noncontrolled wheel) brake fluid pressure Pri, is set to a new command value Pri*$_{(new)}$. That is, the new command values Pro*$_{(new)}$ and Pri*$_{(new)}$ are represented as follows.

$$Pro^*_{(new)} = Pro^*_{(n)} = Pro^*_{(n-1)} - \Delta Pdr + \Delta P_{dec}$$
$$= Pro^*_{(n-1)} - (\Delta Pdr - \Delta P_{dec})$$
$$Pri^*_{(new)} = Pri^*_{(n)} = Pri^*_{(n-1)} - \Delta Pdr + \Delta P_{dec}$$
$$= Pri^*_{(n-1)} - (\Delta Pdr - \Delta P_{dec})$$

On the contrary, in the understeer suppression control mode, a brake fluid pressure value, obtained by adding pressure-reduction-mode cancel correction value ΔP$_{dec}$ to the current value of the command value Pfo* (calculated through step S206) of turning outside front wheel (VDC noncontrolled wheel) brake fluid pressure Pfo, is set to a new command value Pfo*$_{(new)}$. At the same time, a brake fluid pressure value, obtained by adding pressure-reduction-mode cancel correction value ΔP$_{dec}$ to the current value of the command value Pfi* (calculated through step S206) of turning inside front wheel (VDC noncontrolled wheel) brake fluid pressure Pfi, is set to a new command value Pfi*$_{(new)}$. That is, the new command values Pfo*$_{(new)}$ and Pfi*$_{(new)}$ are represented as follows.

$$Pfo^*_{(new)} = Pfo^*_{(n)} = Pfo^*_{(n-1)} - \Delta Pdr + \Delta P_{dec}$$
$$= Pfo^*_{(n-1)} - (\Delta Pdr - \Delta P_{dec})$$
$$Pfi^*_{(new)} = Pfi^*_{(n)} = Pfi^*_{(n-1)} - \Delta Pdr + \Delta P_{dec}$$
$$= Pfi^*_{(n-1)} - (\Delta Pdr - \Delta P_{dec})$$

Figure 12:
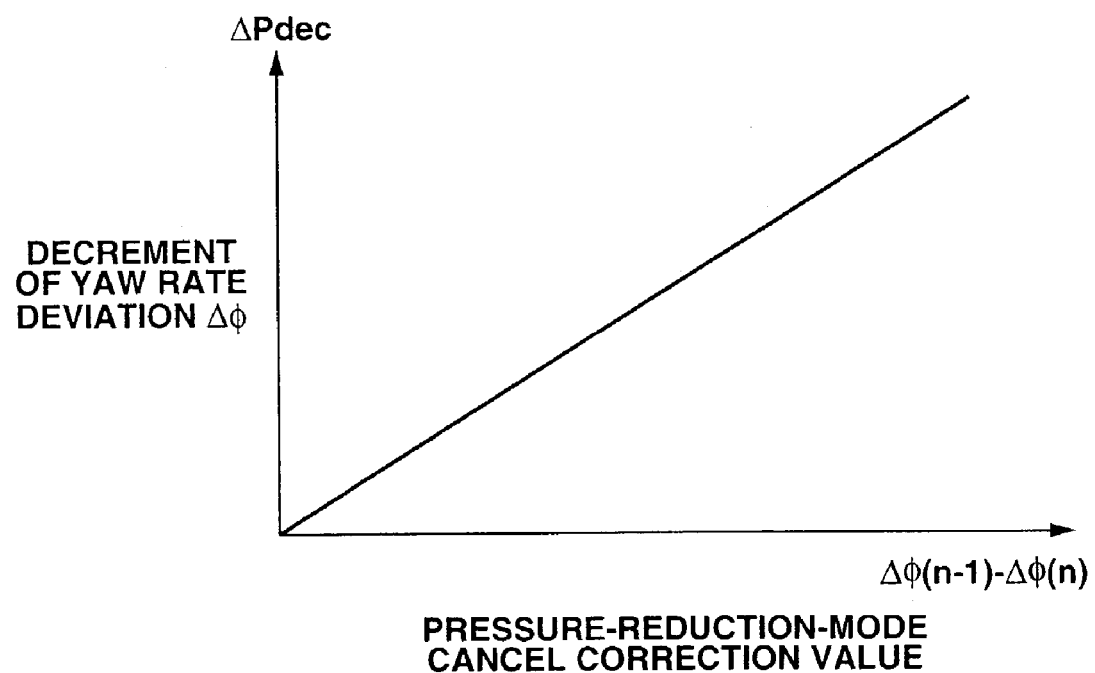
FIG. 12 is a preprogrammed characteristic map showing the relationship between a decrement $(\Delta\phi_{(n-1)}-\Delta\phi_{(n)})$ of yaw rate deviation $\Delta\phi$ and a pressure-reduction-mode cancel correction value $\Delta P_{dec}$.

As can be seen from the preprogrammed ($\Delta\phi_{(n-1)} - \Delta\phi_{(n)}$) versus $\Delta P_{dec}$, characteristic map shown in FIG. 12, pressure-reduction-mode cancel correction value $\Delta P_{dec}$ is set to increase, as a decrement of yaw rate deviation $\Delta\phi$, defined by ($\Delta\phi_{(n-1)} - \Delta\phi_{(n)}$), increases. The adequate recovery of the margin for lateral grip for the VDC noncontrolled wheel means that the decrement of yaw rate deviation $\Delta\phi$, defined by ($\Delta\phi_{(n-1)} - \Delta\phi_{(n)}$) is great. For the reasons set forth above, the decreasing amount for brake fluid pressure decrement $\Delta Pdr$, that is, correction value pressure-reduction-mode cancel correction value $\Delta P_{dec}$ is variably set depending on the recovery state of the margin for lateral grip for the VDC noncontrolled wheel. On the assumption that the differential motion between front and rear wheel axles is permanently limited by means of the differential mechanism incorporated in the VDC system equipped 4WD and thus the previously-discussed transferred braking force is present, the VDC system of the embodiment capable of executing the 3rd brake fluid pressure compensation routine, operates as follows.

Figure 13A:
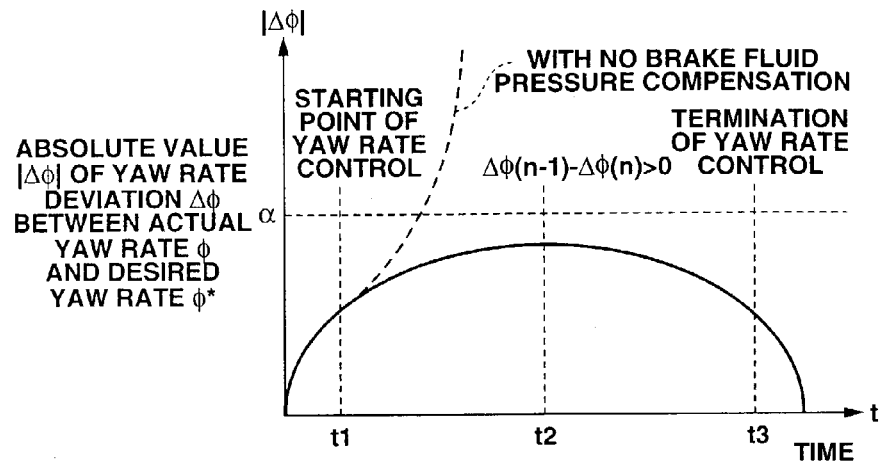
FIG. 13A is a timing chart showing a change in an absolute value $|\Delta\phi|(=|\phi-\phi^*|)$ of yaw rate deviation $\Delta\phi$ between actual yaw rate $\phi$ and desired yaw rate $\phi^*$, obtained by the system executing the third brake fluid pressure compensation routine shown in FIG. 11 or a fourth brake fluid pressure compensation routine shown in FIG. 14.
Figure 13B:
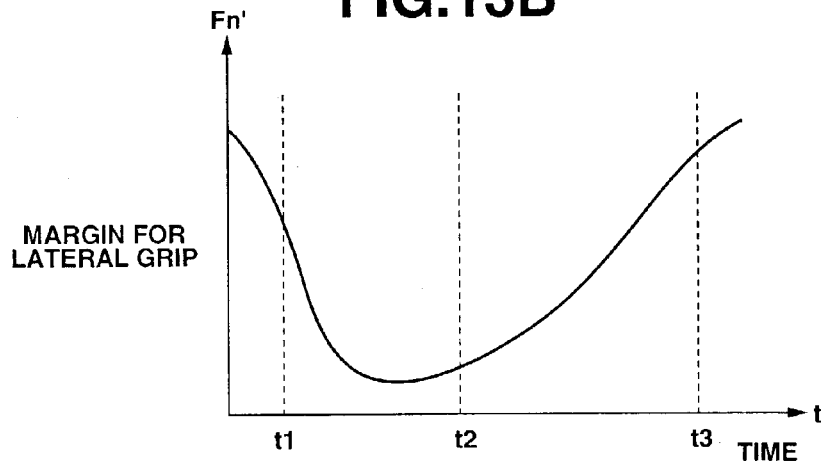
FIG. 13B is a timing chart showing a change in a margin Fn' for lateral grip of the wheel on the road, obtained by the system executing the fourth brake fluid pressure compensation routine shown in FIG. 14.
Figure 13C:
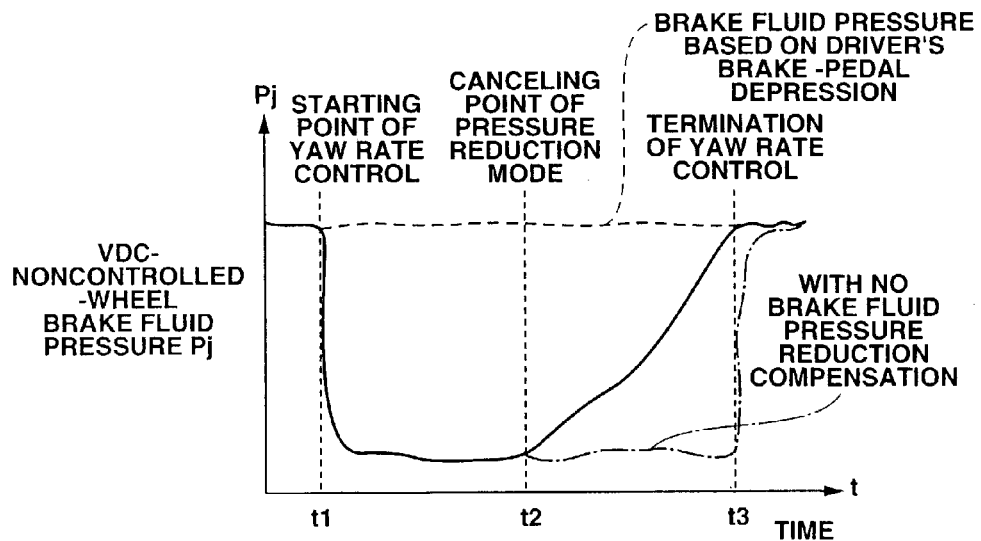
FIG. 13C is a timing chart showing a change in brake fluid pressure Pj applied to each VDC noncontrolled wheel during operation of the system executing the third brake fluid pressure compensation routine shown in FIG. 11 or the fourth brake fluid pressure compensation routine shown in FIG. 14.

When starting yaw rate control (understeer suppression control) at the time t1 of FIGS. 13A–13C during the right-hand turn with the driver's brake-pedal depression to suppress strong understeer tendencies, VDC controller 4 first calculates yaw-moment controlled variable $\Delta M$ which is based on vehicle speed VSP and steer angle $\theta$ and acts to rotate the vehicle rightwards about the z-axis of the vehicle axis system (x, y, z). At this time, the absolute value |$\Delta M$| of yaw-moment controlled variable $\Delta M$ is greater than "0", and thus the answer to step S201 of FIG. 11 becomes affirmative (YES). Thus, through step S202, the braking force to be applied to rear-right road wheel 1RR (the VDC controlled wheel for understeer suppression) is calculated in such a manner as to realize yaw-moment controlled variable $\Delta M$ calculated. Then, a command value Pj* of the brake fluid pressure of rear-right road wheel 1RR is calculated. Thereafter, the routine of FIG. 11 flows from step S202 via steps S203 and S204 to step S206, because the vehicle is in the understeer suppression control mode with the driver's brake-pedal depression. During understeer suppression control, a brake fluid pressure value, obtained by subtracting brake fluid pressure decrement $\Delta Pdr$ from the current value of turning outside front wheel (VDC noncontrolled wheel) brake fluid pressure Pfo, estimated by master-cylinder pressure Pm, is set to a new command value Pfo*$_{(new)}$, that is, Pfo*$_{(new)}$=Pfo*$_{(n)}$=Pfo*$_{(n-1)}$−$\Delta Pdr$. At the same time, a brake fluid pressure value, obtained by subtracting brake fluid pressure decrement $\Delta Pdr$ from the current value of turning inside front wheel (VDC noncontrolled wheel) brake fluid pressure Pfi, estimated by master-cylinder pressure Pm, is set to a new command value Pfi*$_{(new)}$, that is, Pfi*$_{(new)}$=Pfi*$_{(n)}$=Pfi*$_{(n-1)}$−$\Delta Pdr$. Therefore, as can be appreciated from a rapid drip in the brake fluid pressure of the VDC noncontrolled wheel (each of front wheels 1FL, 1FR) at t1 of the time chart of FIG. 13C, in the presence of the driver's brake-pedal depression during understeer suppression control, the brake fluid pressure (Pfo, Pfi) of each VDC noncontrolled wheel (each of front wheels 1FL, 1FR on which the transferred braking forces act during understeer suppression control) is decreasingly compensated for by brake fluid pressure decrement $\Delta Pdr$. As discussed above, according to the VDC system of the embodiment capable of executing the 3rd brake fluid pressure compensation routine, in the presence of the driver's brake-pedal depression and when applying the braking force to the VDC controlled rear-right wheel 1RR during understeer suppression control on the right-hand turn with the limited differential motion between front and rear wheel axles, the transferred braking force acts on each of VDC noncontrolled wheel (each of front wheels 1FL, 1FR). At this time, the command value Pj* of the brake fluid pressure of each VDC noncontrolled wheel (each of front wheels 1FL, 1FR) is decreasingly compensated for by brake fluid pressure decrement $\Delta Pdr$. Therefore, it is possible to effectively prevent the sum of (i) the first braking force caused by the driver's brake-pedal depression and (ii) the second braking force (the transferred braking force) from exceeding a lateral-grip-force limit of each VDC noncontrolled wheel on the road, while continuously executing understeer suppression control with the limited differential motion between front and rear wheel axles (see the yaw-rate-deviation $\Delta\phi$ change indicated by the solid curved line just after t1 of FIG. 13A and the vehicle-travel path indicated by the one-dotted curved line in FIG. 6). Conversely when there is no brake fluid pressure compensation for the applied braking force to rear-right road wheel 1RR (VDC controlled wheel) and no VDC-noncontrolled-wheel brake fluid pressure reduction compensation for the applied braking force to front wheels 1FL and 1FR (VDC noncontrolled wheels) during understeer suppression control on the right-hand turn with the limited differential motion between front and rear wheel axles, a total braking force, that is, the sum of (i) the first braking force caused by the driver's brake-pedal depression and (ii) the second braking force (the transferred braking force) both acting on each VDC noncontrolled wheel (each of front wheels 1FL, 1FR) becomes excessively great. There is an increased tendency for the sum of the first and second braking forces to exceed the lateral-grip-force limit of the VDC noncontrolled wheel on the road. This undesirably promotes the understeer tendencies (see the yaw-rate-deviation $\Delta\phi$ change indicated by the broken line just after t1 of FIG. 13A and the vehicle-travel path indicated by the leftmost two-dotted curved line in FIG. 6).

Thereafter, suppose that the understeer tendencies are effectively suppressed during subsequent executions of the 3rd brake fluid pressure compensation routine of FIG. 11, and thus the absolute value |$\Delta\phi_{(n)}$| of the current value $\Delta\phi_{(n)}$ of yaw rate deviation $\Delta\phi$ becomes less than predetermined yaw-rate-deviation threshold value $\alpha$ (that is, |$\Delta\phi_{(n)}$|<$\alpha$), and additionally the maximal value of the function |$\Delta\phi$|=f(t), which indicates a change in the absolute value |$\Delta\phi$| of yaw rate deviation $\Delta\phi$ with respect to t (time), has been reached and thus the absolute value |$\Delta\phi$| of yaw rate deviation $\Delta\phi$ tends to decrease (that is, (|$\Delta\phi_{(n-1)}$|−|$\Delta\phi_{(n)}$|)>0. In such a case, the routine of FIG. 11 flows from step S201 through steps S202, S203, S204, S206, S207, and S208 to step S209. At step S209, during understeer suppression control, a brake fluid pressure value, obtained by adding pressure-reduction-mode cancel correction value $\Delta P_{dec}$ to the current value of the command value Pfo* (calculated through step S206) of turning outside front wheel (VDC noncontrolled wheel)

brake fluid pressure Pfo, is set to a new command value Pfo*$_{(new)}$, that is, Pfo*$_{(new)}$=Pfo*$_{(n)}$=Pfo*$_{(n-1)}$−ΔPdr+ΔP$_{dec}$. At the same time, a brake fluid pressure value, obtained by adding pressure-reduction-mode cancel correction value ΔP$_{dec}$ to the current value of the command value Pfi* (calculated through step S206) of turning inside front wheel (VDC noncontrolled wheel) brake fluid pressure Pfi, is set to a new command value Pfi*$_{(new)}$, that is, Pfi*$_{(new)}$=Pfi*$_{(n)}$=Pfi*$_{(n-1)}$−ΔPdr+ΔP$_{dec}$. In this manner, when, during understeer suppression control, the absolute value |Δϕ| of yaw rate deviation Δϕ has already been reduced to below predetermined yaw-rate-deviation threshold value α just after the time t2, the VDC controller operates to terminate or inhibit or cancel the VDC-noncontrolled-wheel brake fluid pressure reduction control mode (i.e., the opposite-side wheel brake fluid pressure reduction control mode executed through step S206 of FIG. 11) during which the VDC-noncontrolled-wheel braking force is reduced by an excess of the sum of (i) the first braking force applied to each VDC noncontrolled wheel by the driver's brake-pedal depression and (ii) the second braking force (the transferred braking force) over the lateral-grip-force limit of each VDC noncontrolled wheel on the road (see a gradual rise in the VDC-noncontrolled-wheel brake fluid pressure from the time t2 of FIG. 13C). Suppose that the absolute value |Δϕ$_{(n)}$| of the current value Δϕ$_{(n)}$ of yaw rate deviation Δϕ becomes reduced at an increasing tempo (see a rapid drop in the absolute value |Δϕ$_{(n)}$| at t3 of FIG. 13A). Thereafter, the longitudinal grip force of the VDC noncontrolled wheel (each of front wheels 1FL, 1FR) on the road becomes great. As a result, the decrement of yaw rate deviation Δϕ, defined by (Δϕ$_{(n-1)}$−Δϕ$_{(n)}$), also becomes great. In other words, the margin for lateral grip for the VDC noncontrolled wheel has already recovered adequately. Under these conditions, as can be appreciated from the preprogrammed (Δϕ$_{(n-1)}$−Δϕ$_{(n)}$) versus ΔP$_{dec}$ characteristic map shown in FIG. 12, the decrement for brake fluid pressure decrement ΔPdr, that is, correction value pressure-reduction-mode cancel correction value ΔP$_{dec}$ becomes increased at an increasing tempo. In this manner, the VDC-noncontrolled-wheel (each of front wheels 1FL, 1FR) brake fluid pressure reduction control mode (i.e., the opposite-side wheel brake fluid pressure reduction control mode executed through step S206 of FIG. 11) can be smoothly canceled. Finally, at the last stage of the VDC-noncontrolled-wheel (each of front wheels 1FL, 1FR) brake fluid pressure reduction control mode during understeer suppression control, the front wheel-brake cylinder pressures become recovered to respective brake fluid pressures Pfo, Pfi based on the driver's brake-pedal depression.

As will be appreciated from the above, according to the VDC system of the embodiment capable of executing the 3rd routine of FIG. 11, when yaw rate deviation Δϕ becomes reduced to below predetermined yaw-rate-deviation threshold value α (that is, |Δϕ$_{(n)}$|<α), and additionally yaw rate deviation Δϕ tends to decrease (that is, |Δϕ$_{(n-1)}$|−|Δϕ$_{(n)}$|>0, and thus the understeer tendencies have already suppressed satisfactorily, the VDC-noncontrolled-wheel brake fluid pressure reduction control mode (i.e., the opposite-side wheel brake fluid pressure reduction control mode executed through step S206 of FIG. 11) can be smoothly reliably canceled. This effectively reliably suppresses understeer tendencies from developing undesirably. It is possible to timely switch from the VDC-noncontrolled-wheel brake fluid pressure reduction control mode to the normal brake fluid pressure regulating mode based on the driver's brake-pedal depression, depending on the recovery state of the margin for lateral grip for each of VDC noncontrolled wheels (front wheels 1FL, 1FR) during understeer suppression control, thus keeping the lateral grip limit for the VDC noncontrolled wheel at a comparatively high level.

When starting yaw rate control (oversteer suppression control) at the time t1 during the right-hand turn with the driver's brake-pedal depression to suppress strong oversteer tendencies, VDC controller 4 first calculates yaw-moment controlled variable ΔM which is based on vehicle speed VSP and steer angle θ and acts to rotate the vehicle leftwards about the z-axis of the vehicle axis system (x, y, z). At this time, the absolute value |ΔM| of yaw-moment controlled variable ΔM is greater than "0", and thus the answer to step S201 of FIG. 11 becomes affirmative (YES). Thus, through step S202, the braking force to be applied to front-left road wheel 1FL (the VDC controlled wheel for oversteer suppression) is calculated in such a manner as to realize yaw-moment controlled variable ΔM calculated. Then, a command value Pj* of the brake fluid pressure of front-left road wheel 1FL is calculated. Thereafter, the routine of FIG. 11 flows from step S202 via steps S203 and S204 to step S205, because the vehicle is in the oversteer suppression control mode with the driver's brake-pedal depression. During oversteer suppression control, a brake fluid pressure value, obtained by subtracting brake fluid pressure decrement ΔPdr from the current value of turning outside rear wheel (VDC noncontrolled wheel) brake fluid pressure Pro, estimated by master-cylinder pressure Pm, is set to a new command value Pro*$_{(new)}$, that is, Pro*$_{(new)}$=Pro*$_{(n)}$=Pro*$_{(n-1)}$−ΔPdr. At the same time, a brake fluid pressure value, obtained by subtracting brake fluid pressure decrement ΔPdr from the current value of turning inside rear wheel (VDC noncontrolled wheel) brake fluid pressure Pri, estimated by master-cylinder pressure Pm, is set to a new command value Pri*$_{(new)}$, that is, Pri*$_{(new)}$=Pri*$_{(n)}$=Pri*$_{(n-1)}$−ΔPdr. Therefore, as can be appreciated from a rapid drip in the brake fluid pressure of the VDC noncontrolled wheel (each of rear wheels 1RL, 1RR) at t1 of the time chart of FIG. 13C, in the presence of the driver's brake-pedal depression during oversteer suppression control, the brake fluid pressure (Pro, Pri) of each VDC noncontrolled wheel (each of rear wheels 1RL, 1RR on which the transferred braking forces act during oversteer suppression control) is decreasingly compensated for by brake fluid pressure decrement ΔPdr. As discussed above, according to the VDC system of the embodiment capable of executing the 3rd brake fluid pressure compensation routine, in the presence of the driver's brake-pedal depression and when applying the braking force to the VDC controlled front-left wheel 1FL during oversteer suppression control on the right-hand turn with the limited differential motion between front and rear wheel axles, the transferred braking force acts on each of VDC noncontrolled wheel (each of rear wheels 1RL, 1RR). At this time, the command value Pj* of the brake fluid pressure of each VDC noncontrolled wheel (each of rear wheels 1RL, 1RR) is decreasingly compensated for by brake fluid pressure decrement ΔPdr. Therefore, it is possible to effectively prevent the sum of (i) the first braking force caused by the driver's brake-pedal depression and (ii) the second braking force (the transferred braking force) from exceeding a lateral-grip-force limit of each VDC noncontrolled wheel on the road, while continuously executing oversteer suppression control with the limited differential motion between front and rear wheel axles (see the yaw-rate-deviation Δϕ change indicated by the solid curved line just after t1 of FIG. 13A and the vehicle-travel path indicated by the solid curved line in FIG. 7). Conversely when there is no brake fluid pressure compensation for the applied braking force to front-left road wheel 1FL (VDC controlled wheel) and no VDC-noncontrolled-wheel brake fluid pressure reduction compensation for the applied braking force to rear wheels 1RL and 1RR (VDC noncontrolled wheels) during oversteer suppression control on the right-hand turn with the limited differential motion between front and rear wheel axles, a total braking force, that is, the sum of (i) the first braking force caused by the driver's brake-pedal depression and (ii) the second braking force (the transferred braking force) both acting on each VDC noncontrolled wheel (each of rear wheels 1RL, 1RR) becomes excessively great. There is an increased tendency for the sum of the first and second braking forces to exceed the lateral-grip-force limit of the VDC noncontrolled wheel on the road. This undesirably promotes the oversteer tendencies (see the yaw-rate-deviation $\Delta\phi$ change indicated by the broken line just after t1 of FIG. 13A and the vehicle-travel path indicated by the rightmost two-dotted curved line in FIG. 7).

Thereafter, suppose that the oversteer tendencies are effectively suppressed during subsequent executions of the 3rd brake fluid pressure compensation routine of FIG. 11, and thus the absolute value $|\Delta\phi_{(n)}|$ of the current value $\Delta\phi_{(n)}$ of yaw rate deviation $\Delta\phi$ becomes less than predetermined yaw-rate-deviation threshold value $\alpha$ (that is, $|\Delta\phi_{(n)}|<\alpha$), and additionally the maximal value of the function $|\Delta\phi|=f(t)$, which indicates a change in the absolute value $|\Delta\phi|$ of yaw rate deviation $\Delta\phi$ with respect to t (time), has been reached and thus the absolute value $|\Delta\phi|$ of yaw rate deviation $\Delta\phi$ tends to decrease (that is, $(|\Delta\phi_{(n-1)}|-|\Delta\phi_{(n)}|>0$). In such a case, the routine of FIG. 11 flows from step S201 through steps S202, S203, S204, S205, S207, and S208 to step S209. At step S209, during oversteer suppression control, a brake fluid pressure value, obtained by adding pressure-reduction-mode cancel correction value $\Delta P_{dec}$ to the current value of the command value Pro* (calculated through step S205) of turning outside rear wheel (VDC noncontrolled wheel) brake fluid pressure Pro, is set to a new command value Pro*$_{(new)}$, that is, Pro*$_{(new)}$=Pro*$_{(n)}$=Pro*$_{(n-1)}$−$\Delta$Pdr+$\Delta P_{dec}$. At the same time, a brake fluid pressure value, obtained by adding pressure-reduction-mode cancel correction value $\Delta P_{dec}$ to the current value of the command value Pri* (calculated through step S205) of turning inside rear wheel (VDC noncontrolled wheel) brake fluid pressure Pri, is set to a new command value Pri*$_{(new)}$, that is, Pri*$_{(new)}$=Pri*$_{(n)}$=Pri*$_{(n-1)}$−$\Delta$Pdr+$\Delta P_{dec}$. In this manner, when, during oversteer suppression control, the absolute value $|\Delta\phi|$ of yaw rate deviation $\Delta\phi$ has already been reduced to below predetermined yaw-rate-deviation threshold value $\alpha$ just after the time t2, the VDC controller operates to terminate or inhibit or cancel the VDC-noncontrolled-wheel brake fluid pressure reduction control mode (i.e., the opposite-side wheel brake fluid pressure reduction control mode executed through step S205 of FIG. 11) during which the VDC-noncontrolled-wheel braking force is reduced by an excess of the sum of (i) the first braking force applied to each VDC noncontrolled wheel by the driver's brake-pedal depression and (ii) the second braking force (the transferred braking force) over the lateral-grip-force limit of each VDC noncontrolled wheel on the road (see a gradual rise in the VDC-noncontrolled-wheel brake fluid pressure from the time t2 of FIG. 13C). Suppose that the absolute value $|\Delta\phi_{(n)}|$ of the current value $\Delta\phi_{(n)}$ of yaw rate deviation $\Delta\phi$ becomes reduced at an increasing tempo (see a rapid drop in the absolute value $|\Delta\phi_{(n)}|$ of FIG. 13A). Thereafter, the longitudinal grip force of the VDC noncontrolled wheel (each of rear wheels 1RL, 1RR) on the road becomes great. As a result, the decrement of yaw rate deviation $\Delta\phi$, defined by $(\Delta\phi_{(n-1)}-\Delta\phi_{(n)})$, also becomes great. In other words, the margin for lateral grip for the VDC noncontrolled wheel has already recovered adequately. Under these conditions, as can be appreciated from the preprogrammed $(\Delta\phi_{(n-1)}-\Delta\phi_{(n)})$ versus $\Delta P_{dec}$ characteristic map shown in FIG. 12, the decrement for brake fluid pressure decrement $\Delta$Pdr, that is, correction value pressure-reduction-mode cancel correction value $\Delta P_{dec}$ becomes increased at an increasing tempo. In this manner, the VDC-noncontrolled-wheel (each of rear wheels 1RL, 1RR) brake fluid pressure reduction control mode (i.e., the opposite-side wheel brake fluid pressure reduction control mode executed through step S205 of FIG. 11) can be smoothly canceled. Finally, at the last stage of the VDC-noncontrolled-wheel (each of rear wheels 1RL, 1RR) brake fluid pressure reduction control mode during oversteer suppression control, the rear wheel-brake cylinder pressures become recovered to respective brake fluid pressures Pro, Pri based on the driver's brake-pedal depression.

As will be appreciated from the above, according to the VDC system of the embodiment capable of executing the 3rd routine of FIG. 11, when yaw rate deviation $\Delta\phi$ becomes reduced to below predetermined yaw-rate-deviation threshold value $\alpha$ (that is, $|\Delta\phi_{(n)}|<\alpha$), and additionally yaw rate deviation $\Delta\phi$ tends to decrease (that is, $(|\Delta\phi_{(n-1)}|-|\Delta\phi_{(n)}|>0$), and thus the oversteer tendencies have already suppressed satisfactorily, the VDC-noncontrolled-wheel brake fluid pressure reduction control mode (i.e., the opposite-side wheel brake fluid pressure reduction control mode executed through step S205 of FIG. 11) can be smoothly reliably canceled. This effectively reliably suppresses oversteer tendencies from developing undesirably. It is possible to switch from the VDC-noncontrolled-wheel brake fluid pressure reduction control mode to the normal brake fluid pressure regulating mode based on the driver's brake-pedal depression, depending on the recovery state of the margin for lateral grip for each of VDC noncontrolled wheels (rear wheels 1RL, 1RR) during oversteer suppression control, thus keeping the lateral grip limit for the VDC noncontrolled wheel at a comparatively high level.

Figure 14:
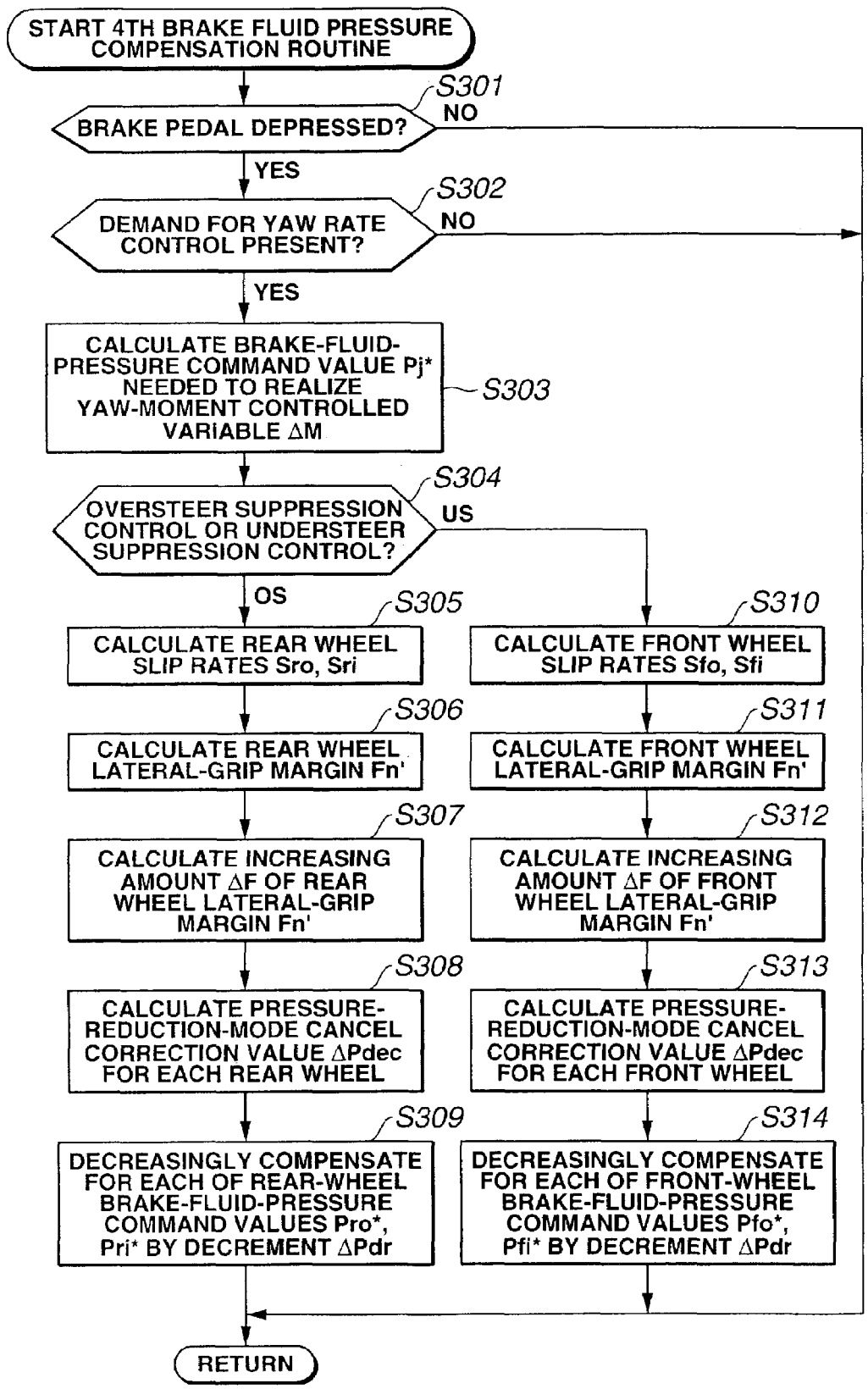
FIG. 14 is a flow chart illustrating the fourth brake fluid pressure compensation routine executed within the processor of the electronic control unit incorporated in the VDC system of the embodiment, when the brake pedal is depressed by the driver during the VDC operating mode.

Referring now to FIG. 14, there is shown the 4th brake fluid pressure compensation routine, executed during vehicle dynamics control (yaw rate control), taking into account the driver's brake-pedal depression. The 4th brake fluid pressure compensation routine shown in FIG. 14 is also executed as time-triggered interrupt routines to be triggered every predetermined sampling time intervals $\Delta T$ such as 10 milliseconds.

At step S301, a check is made to determine whether, based on the signal from brake switch 10, whether the driver depresses brake pedal 3. In the presence of the driver's brake-pedal depression during vehicle dynamics control (yaw rate control), the routine proceeds from step S301 to step S302. Conversely in the absence of the driver's brake-pedal depression during vehicle dynamics control, the program exits this subroutine and returns to the main program. The state of the driver's brake-pedal depression is detected by brake switch 10. In lieu thereof, master-cylinder pressure Pm, which is sensed by master-cylinder pressure sensor 11, may be used. In this case, when master-cylinder pressure Pm exceeds a predetermined threshold value, VDC controller 4 determines that the driver's brake-pedal depression is present.

At step S302, a check is made to determine, based on yaw-moment controlled variable $\Delta M$ obtained by the yaw-moment controlled variable $\Delta M$ arithmetic processing of FIG. 10, whether a demand for yaw rate control is present or absent. When the absolute value $|\Delta M|$ of yaw-moment controlled variable ΔM (=ΔM$_{F/F}$+ΔM$_{F/B}$) is greater than "0", that is, |ΔM|>0, or when VDC off switch 12 is turned OFF to enable the yaw rate control function, VDC controller 4 determines that the demand for yaw rate control is present. As discussed above, when the answer to step S302 is affirmative (YES), the routine proceeds to step S303. Conversely when |ΔM|≦0 or when VDC off switch 12 is turned ON to disable the yaw rate control function, VDC controller 4 determines that the demand for yaw rate control is absent. That is, when the answer to step S302 is negative (NO), the program exits this subroutine and returns to the main program.

At step S303, a braking force applied to each road wheel is calculated in such a manner as to realize yaw-moment controlled variable ΔM, and then a command value Pj* of the brake fluid pressure of each wheel is calculated. In a similar manner to the 1st, 2nd, and 3rd subroutines of FIGS. 2, 8 and 11, in the VDC system of the shown embodiment capable of the 4th routine of FIG. 14, to suppress oversteer tendencies during vehicle dynamics control, a braking force is applied to only the outside front wheel (VDC controlled wheel) in the turn. In contrast, to suppress understeer tendencies during vehicle dynamics control, a braking force is applied to only the inside rear wheel (VDC controlled wheel) in the turn.

At step S304, a check is made to determine, based on the sign of yaw-moment controlled variable ΔM, if the VDC system equipped 4WD is in an understeer suppression control mode (that is, in case that the sign of yaw-moment controlled variable ΔM is positive) or in an oversteer suppression control mode (that is, in case that the sign of yaw-moment controlled variable ΔM is negative). When the VDC equipped 4WD is in the oversteer suppression control mode, the routine proceeds from step S304 to step S305. Conversely when the VDC equipped 4WD is in the understeer suppression control mode, the routine proceeds from step S304 to step S310.

At step S305, a turning outside rear wheel slip rate Sro (=(VSP−Vwro)/VSP) is calculated based on both turning outside rear wheel speed Vwro and vehicle speed VSP, whereas a turning inside rear wheel slip rate Sri (=(VSP−Vwri)/VSP) is calculated based on both turning inside rear wheel speed Vwri and vehicle speed VSP.

At step S306, in the oversteer suppression control mode, to estimate or derive a margin Fn' for lateral grip force of the VDC noncontrolled wheel (each rear wheel during oversteer suppression control), a maximum lateral grip force, that is, a lateral grip limit F, which can be generated at each of rear-left and rear-right wheels 1RL and 1RR (VDC noncontrolled wheels), is first calculated based on both the rear-left and rear-right wheel slip rates Srl and Srr (exactly, turning outside rear and turning inside rear wheel slip rates Sro and Sri). In order to calculate or retrieve the maximum lateral grip force (the lateral grip limit) F, VDC controller 4 actually uses the preprogrammed slip rate Sj versus maximum lateral grip force F characteristic map of FIG. 5, which is correlated to tire characteristics of tires attached to the vehicular road wheels. Then, the margin Fn' for lateral grip force of each VDC noncontrolled wheel on the road can be estimated as the difference between the current value Fn of maximum lateral grip force (lateral grip limit) F retrieved from the preprogrammed Sj–F characteristic map and the actual lateral grip force. The actual grip force can be estimated based on longitudinal acceleration α$_y$. Alternatively, the actual grip force can be estimated based on vehicle speed VSP and steer angle θ. In lieu thereof, lateral grip limit F may be estimated based on the wheel load and braking/driving force.

At step S307, an increasing amount ΔF of margin Fn' for lateral grip of each VDC noncontrolled wheel (each rear wheel during oversteer suppression control) on the road is calculated by subtracting the previous value Fn−1' of the lateral-grip margin from the current value Fn' of the lateral-grip margin, as follows.

ΔF=Fn'−Fn−1'

At step S308, the decreasing amount for brake fluid pressure decrement ΔPdr, that is, the previously-noted pressure-reduction-mode cancel correction value ΔP$_{dec}$ is variably set depending on the recovery state of the margin for lateral grip for the VDC noncontrolled wheel. More concretely, pressure-reduction-mode cancel correction value ΔP$_{dec}$ for the VDC noncontrolled wheel (the rear wheel) is calculated by multiplying the increasing amount ΔF of lateral-grip margin Fn' with a predetermined rear wheel brake fluid pressure correction factor Kr from the expression P$_{dec}$=ΔF×Kr. Predetermined rear wheel brake fluid pressure correction factor Kr is determined depending on a rear-wheel-brake cylinder pressure receiving are a and/or a brake-pad pressure receiving area.

At step S309, in a similar manner as step S6 of FIG. 2, during the oversteer suppression control mode, a brake fluid pressure value, obtained by subtracting brake fluid pressure decrement ΔPdr from the current value of turning outside rear wheel (VDC noncontrolled wheel) brake fluid pressure Pro is set to a new command value Pro*$_{(new)}$, that is, Pro*$_{(n)}$=Pro*$_{(n−1)}$−ΔPdr. At the same time, a brake fluid pressure value, obtained by subtracting brake fluid pressure decrement ΔPdr from the current value of turning inside rear wheel (VDC noncontrolled wheel) brake fluid pressure Pri is set to a new command value Pri*$_{(new)}$, that is, Pri*$_{(n)}$=Pri*$_{(n−1)}$−ΔPdr. Note that brake fluid pressure decrement ΔPdr is obtained by subtracting pressure-reduction-mode cancel correction value ΔP$_{dec}$ (=ΔF×Kr) for the VDC noncontrolled wheel (the rear wheel) from the previous value ΔPdr$_{(n−1)}$ of brake fluid pressure decrement ΔPdr, that is, ΔPdr (exactly, ΔPdr$_{(n)}$=ΔPdr$_{(n−1)}$−ΔP$_{dec}$. That is to say, the final, new command value Pro*$_{(new)}$ of turning outside rear wheel (VDC noncontrolled wheel) brake fluid pressure Pro is represented by the expression Pro*$_{(new)}$=Pro*$_{(n)}$=Pro*$_{(n−1)}$−ΔPdr=Pro*$_{(n−1)}$−(ΔPdr$_{(n−1)}$−ΔP$_{dec}$). Additionally, the final, new command value Pri*$_{(new)}$ of turning inside rear wheel (VDC noncontrolled wheel) brake fluid pressure Pri is represented by the expression Pri*$_{(new)}$=Pri*$_{(n)}$=Pri*$_{(n−1)}$−ΔPdr=Pri*$_{(n−1)}$−(ΔPdr$_{(n−1)}$−ΔP$_{dec}$). In the VDC system of the embodiment capable of executing the 4th routine of FIG. 14, an initial set value of brake fluid pressure decrement ΔPdr is a rear wheel brake fluid pressure produced by the driver's brake-pedal depression during oversteer suppression control. As mentioned above, step S309 of FIG. 14 is very similar to step S209 of FIG. 11.

On the contrary, in the understeer suppression control mode, at step S310, a turning outside front wheel slip rate Sfo (=(VSP−Vwfo)/VSP) is calculated based on both turning outside front wheel speed Vwfo and vehicle speed VSP, whereas a turning inside front wheel slip rate Sfi (=(VSP−Vwfi)/VSP) is calculated based on both turning inside front wheel speed Vwfi and vehicle speed VSP.

At step S311, in the understeer suppression control mode, to estimate or derive a margin Fn' for lateral grip force of the VDC noncontrolled wheel (the front wheel), a maximum lateral grip force, that is, a lateral grip limit F, which can be generated at each of front-left and front-right wheels 1FL and 1FR (VDC noncontrolled wheels), is first calculated based on both the front-left and front-right wheel slip rates Sfl and Sfr (exactly, turning outside front and turning inside front wheel slip rates Sfo and Sfi). Then, the margin Fn' for lateral grip force of each VDC noncontrolled wheel on the road can be estimated as the difference between the current value Fn of maximum lateral grip force (lateral grip limit) F retrieved from the preprogrammed Sj–F characteristic map of FIG. 5 and the actual lateral grip force.

At step S312, an increasing amount ΔF of margin Fn' for lateral grip of each VDC noncontrolled wheel (each front wheel during understeer suppression control) on the road is calculated by subtracting the previous value Fn−1' of the lateral-grip margin from the current value Fn' of the lateral-grip margin, that is, ΔF=Fn'−Fn−1'.

At step S313, the decreasing amount for brake fluid pressure decrement ΔPdr, that is, the previously-noted pressure-reduction-mode cancel correction value $\Delta P_{dec}$ is variably set depending on the recovery state of the margin for lateral grip for the VDC noncontrolled wheel. More concretely, pressure-reduction-mode cancel correction value $\Delta P_{dec}$ for the VDC noncontrolled wheel (each front wheel during understeer suppression control) is calculated by multiplying the increasing amount ΔF of lateral-grip margin Fn' with a predetermined front wheel brake fluid pressure correction factor Kf from the expression $P_{dec}=\Delta F \times Kf$. Predetermined front wheel brake fluid pressure correction factor Kf is determined depending on a front-wheel-brake cylinder pressure receiving area and/or a brake-pad pressure receiving area.

At step S314, in a similar manner as step S6 of FIG. 2, during the understeer suppression control mode, a brake fluid pressure value, obtained by subtracting brake fluid pressure decrement ΔPdr from the current value of turning outside front wheel (VDC noncontrolled wheel) brake fluid pressure Pfo is set to a new command value Pfo*$_{(new)}$, that is, Pfo*$_{(n)}$=Pfo*$_{(n-1)}$−ΔPdr. At the same time, a brake fluid pressure value, obtained by subtracting brake fluid pressure decrement ΔPdr from the current value of turning inside front wheel (VDC noncontrolled wheel) brake fluid pressure Pfi is set to a new command value Pfi*$_{(new)}$, that is, Pfi*$_{(n)}$=Pfi*$_{(n-1)}$−ΔPdr. Note that brake fluid pressure decrement ΔPdr is obtained by subtracting pressure-reduction-mode cancel correction value $\Delta P_{dec}$ (=ΔF×Kf) for the VDC noncontrolled wheel (the front wheel) from the previous value ΔPdr$_{(n-1)}$ of brake fluid pressure decrement ΔPdr, that is, ΔPdr (exactly, ΔPdr$_{(n)}$)=ΔPdr$_{(n-1)}$−$\Delta P_{dec}$. That is to say, the final, new command value Pfo*$_{(new)}$ of turning outside front wheel (VDC noncontrolled wheel) brake fluid pressure Pfo is represented by the expression Pfo*$_{(new)}$=Pfo*$_{(n)}$=Pfo*$_{(n-1)}$−ΔPdr=Pfo*$_{(n-1)}$−(ΔPdr$_{(n-1)}$−$\Delta P_{dec}$). Additionally, the final, new command value Pfi*$_{(new)}$ of turning inside front wheel (VDC noncontrolled wheel) brake fluid pressure Pfi is represented by the expression Pfi*$_{(new)}$=Pfi*$_{(n)}$=Pfi*$_{(n-1)}$−ΔPdr=Pfi*$_{(n-1)}$−(ΔPdr$_{(n-1)}$−$\Delta P_{dec}$). In the VDC system of the embodiment capable of executing the 4th routine of FIG. 14, an initial set value of brake fluid pressure decrement ΔPdr is a front wheel brake fluid pressure produced by the driver's brake-pedal depression during understeer suppression control. As mentioned above, step S314 of FIG. 14 is also very similar to step S209 of FIG. 11. On the assumption that the differential motion between front and rear wheel axles is permanently limited by means of the differential mechanism incorporated in the VDC system equipped 4WD and thus the previously-discussed transferred braking force is present, the VDC system of the embodiment capable of executing the 4th brake fluid pressure compensation routine, operates as follows.

When starting yaw rate control (understeer suppression control) at the time t1 of FIGS. 13A–13C during the right-hand turn with the driver's brake-pedal depression to suppress strong understeer tendencies, VDC controller 4 first calculates yaw-moment controlled variable ΔM which is based on vehicle speed VSP and steer angle θ and acts to rotate the vehicle rightwards about the z-axis of the vehicle axis system (x, y, z). At this time, the absolute value |ΔM| of yaw-moment controlled variable ΔM is greater than "0", and thus the answer to step S302 of FIG. 11 becomes affirmative (YES). Thus, through step S303, the braking force to be applied to rear-right road wheel 1RR (the VDC controlled wheel for understeer suppression) is calculated in such a manner as to realize yaw-moment controlled variable ΔM calculated. Then, a command value Pj* of the brake fluid pressure of rear-right road wheel 1RR is calculated Thereafter, the routine of FIG. 14 flows from step S303 via step S304 to step S310, because the vehicle is in the understeer suppression control mode with the driver's brake-pedal depression. By way of step S310, turning outside front wheel slip rate Sfo (=(VSP−Vwfo)/VSP) and turning inside front wheel slip rate Sfi (=(VSP−Vwfi)/VSP) are calculated. When the vehicle has a strong understeer tendency, turning outside front wheel slip rate Sfo (=(VSP−Vwfo)/VSP) and turning inside front wheel slip rate Sfi (=(VSP−Vwfi)/VSP) become great. After this, at step S311, owing to the great front wheel slip rate (Sfo, Sfi), margin Fn' for lateral grip force of the VDC noncontrolled wheel (the front wheel) becomes small, and thus increasing amount ΔF of margin Fn' for lateral grip of each VDC noncontrolled wheel (each front wheel during understeer suppression control) on the road is calculated as a negative value through step S312. Pressure-reduction-mode cancel correction value $\Delta P_{dec}$(=ΔF×Kf) for the VDC noncontrolled wheel (each front wheel during understeer suppression control) is also calculated as a negative value, through step S313. At the initial stage of understeer suppression control, brake fluid pressure decrement ΔPdr is still set to its initial value, corresponds to a front wheel brake fluid pressure produced by the driver's brake-pedal depression. Additionally, pressure-reduction-mode cancel correction value $\Delta P_{dec}$ (=ΔF×Kf) for each VDC noncontrolled wheel (each front wheel) is calculated as a negative value. Therefore, at the early stage of understeer suppression control, as appreciated from the expressions for the final, new brake-fluid-pressure command values Pfo*$_{(new)}$ and Pfi*$_{(new)}$ of turning-outside and turning-inside front wheels (VDC noncontrolled wheels), that is, $$Pfo*_{(new)}=Pfo*_{(n)}=Pfo*_{(n-1)}-\Delta Pdr=Pfo*_{(n-1)}-(\Delta Pdr_{(n-1)}-\Delta P_{dec})$$

and $$Pfi*_{(new)}=Pfi*_{(n)}=Pfi*_{(n-1)}-\Delta Pdr=Pfi*_{(n-1)}-(\Delta Pdr_{(n-1)}-\Delta P_{dec}),$$

brake fluid pressure decrement ΔPdr (=ΔPdr$_{(n-1)}$−$\Delta P_{dec}$) for each VDC noncontrolled wheel becomes almost maximum and thus the final, new brake-fluid-pressure command values Pfo*$_{(new)}$ and Pfi*$_{(new)}$ of front wheels (VDC noncontrolled wheels) become negative. As a consequence, as can be seen from the time just after t1 of FIG. 13C, turning outside front and turning inside front brake fluid pressures Pfo and Pfi of VDC noncontrolled wheels (front wheels 1FL, 1FR on which the transferred braking forces act during understeer suppression control) can be decreasingly compensated for at an increasing tempo (see a rapid drop in brake fluid pressure Pj at t1 of FIG. 13C). As discussed above, according to the VDC system of the embodiment capable of executing the 4th brake fluid pressure compensation routine, in the presence of the driver's brake-pedal depression and when applying the braking force to the VDC controlled rear-right wheel 1RR during understeer suppression control on the right-hand turn with the limited differential motion between front and rear wheel axles, brake fluid pressure decrement $\Delta Pdr$ $(=\Delta Pdr_{(n-1)}-\Delta P_{dec})$ for front brake fluid pressures Pfo and Pfi of VDC noncontrolled wheels (front wheels 1FL, 1FR) can be set to increase, as margin Fn' for lateral grip force of the VDC noncontrolled wheel (the front wheel) decreases. This contributes to an increase in the lateral-grip margin of each VDC noncontrolled wheel during understeer suppression control, thereby effectively suppressing understeer tendencies from developing undesirably.

Thereafter, suppose that the understeer tendencies are effectively suppressed during subsequent executions of the 4th brake fluid pressure compensation routine of FIG. 14, and thus the absolute value $|\Delta \phi_{(n)}|$ of the current value $\Delta \phi_{(n)}$ of yaw rate deviation $\Delta \phi$ becomes less than predetermined yaw-rate-deviation threshold value $\alpha$ (that is, $|\Delta \phi_{(n)}|<\alpha$), and additionally the maximal value of the function $|\Delta \phi|=f(t)$, which indicates a change in the absolute value $|\Delta \phi|$ of yaw rate deviation $\Delta \phi$ with respect to t (time), has been reached and thus the absolute value $|\Delta \phi|$ of yaw rate deviation $\Delta \phi$ tends to decrease (that is, $(|\Delta \phi_{(n-1)}|-|\Delta \phi_{(n)}|)>0$. In other words, increasing amount $\Delta F$ of margin Fn' for lateral grip of each VDC noncontrolled wheel (each front wheel during understeer suppression control) on the road tends to increase (see a moderate rise in lateral-grip margin Fn' from t2 of FIG. 13B). In such a case, the routine of FIG. 14 flows from step S301 through steps S302, S303, S304, S310, and S311 to step S312. At step S312, increasing amount $\Delta F$ of lateral-grip margin Fn' of each VDC noncontrolled wheel (each front wheel) on the road becomes positive. At step S313, pressure-reduction-mode cancel correction value $\Delta P_{dec}$ $(=\Delta F\times Kf)$ for each VDC noncontrolled wheel (each front wheel) also becomes positive. Thus, brake fluid pressure decrement $\Delta Pdr$ $(=\Delta Pdr_{(n-1)}-\Delta P_{dec})$ for front brake fluid pressures Pfo and Pfi of VDC noncontrolled wheels (front wheels 1FL, 1FR) gradually reduces. As a result, the final, new brake-fluid-pressure command values $Pfo^*_{(new)}$ and $Pfi^*_{(new)}$ of front wheels (VDC noncontrolled wheels) gradually changes from negative positive. In this manner, when, during understeer suppression control, the absolute value $|\Delta \phi|$ of yaw rate deviation $\Delta \phi$ has already been reduced to below predetermined yaw-rate-deviation threshold value $\alpha$ just after the time t2 and the lateral-grip margin Fn' of each VDC noncontrolled wheel (each front wheel) on the road begins to recover, the VDC controller moderately cancel the VDC-noncontrolled-wheel brake fluid pressure reduction control mode (i.e., the opposite-side wheel brake fluid pressure reduction control mode) during which the VDC-noncontrolled-wheel braking force is reduced by an excess of the sum of (i) the first braking force applied to each VDC noncontrolled wheel by the driver's brake-pedal depression and (ii) the second braking force (the transferred braking force) over the lateral-grip-force limit of each VDC noncontrolled wheel on the road (see a gradual rise in the VDC-noncontrolled-wheel brake fluid pressure from the time t2 of FIG. 13C). Thereafter, during subsequent executions of the 4th brake fluid pressure compensation routine of FIG. 14, suppose that the absolute value $|\Delta \phi_{(n)}|$ of the current value $\Delta \phi_{(n)}$ of yaw rate deviation $\Delta \phi$ becomes reduced at an increasing tempo (see a rapid drop in the absolute value $|\Delta \phi_{(n)}|$ at t3 of FIG. 13A), and thus the lateral-grip margin Fn' of each VDC noncontrolled wheel (each front wheel) on the road becomes great. In such a case, at step S312, increasing amount $\Delta F$ of lateral-grip margin Fn' of each VDC noncontrolled wheel (each front wheel) on the road is calculated as a great value. Thus, at step S313, pressure-reduction-mode cancel correction value $\Delta P_{dec}(=\Delta F\times Kf)$ for each VDC noncontrolled wheel (each front wheel) is also calculated as a great positive value. Therefore, at the last stage of understeer suppression control, as appreciated from the expressions $$Pfo^*_{(new)}=Pfo^*_{(n)}=Pfo^*_{(n-1)}-\Delta Pdr=Pfo^*_{(n-1)}-(\Delta Pdr_{(n-1)}-\Delta P_{dec})$$

and $$Pfi^*_{(new)}=Pfi^*_{(n)}=Pfi^*_{(n-1)}-\Delta Pdr=Pfi^*_{(n-1)}-(\Delta Pdr_{(n-1)}-\Delta P_{dec}),$$

brake fluid pressure decrement $\Delta Pdr$ $(=\Delta Pdr_{(n-1)}-\Delta P_{dec})$ for each VDC noncontrolled wheel becomes almost minimum and thus the final, new brake-fluid-pressure command values $Pfo^*_{(new)}$ and $Pfi^*_{(new)}$ of front wheels (VDC noncontrolled wheels) become rapidly increased and recovered to respective brake fluid pressures Pfo, Pfi based on the driver's brake-pedal depression. (see the value of the VDC-noncontrolled-wheel brake fluid pressure Pj at t3 of FIG. 13C).

As will be appreciated from the above, according to the VDC system of the embodiment capable of executing the 4th routine of FIG. 14, brake fluid pressure decrement $\Delta Pdr$ $(=\Delta Pdr_{(n-1)}-\Delta P_{dec})$ for front brake fluid pressures Pfo and Pfi of VDC noncontrolled wheels (front wheels 1FL, 1FR) begins to increase, when increasing amount $\Delta F$ of margin Fn' for lateral grip of each VDC noncontrolled wheel (each front wheel) on the road becomes changed from negative to positive under a condition where the braking force is applied to rear-right wheel 1RR (VDC controlled wheel) during understeer suppression control). This effectively reliably suppresses understeer tendencies from developing undesirably. It is possible to timely switch from the VDC-noncontrolled-wheel brake fluid pressure reduction control mode to the normal brake fluid pressure regulating mode based on the driver's brake-pedal depression, depending on the recovery state of the margin for lateral grip for each of VDC noncontrolled wheels (front wheels 1FL, 1FR) during understeer suppression control, thus keeping the lateral grip limit for the VDC noncontrolled wheel at a comparatively high level. In the vehicle dynamics control system of the embodiment capable of the 3rd (see FIG. 11) or 4th (see FIG. 14) brake fluid pressure compensation routine, yaw rate sensor 8 functions as a turning-behavior state variable detection means that detects the state variable of the turning behavior of the VDC system equipped 4WD. Steps S204–S209 of FIG. 11 and S304–S314 of FIG. 14 function as a VDC-noncontrolled-wheel braking force compensation means that compensates for the braking force of each VDC noncontrolled wheel. Step S303 and S310 of FIG. 14 function as slip state detection means that detects the state of slip of each VDC noncontrolled wheel. Steps S306 and S311 function as a lateral-grip margin Fn' calculation means that calculates lateral-grip margin Fn' of each VDC noncontrolled wheel. Steps S307–S309 and S312–S314 of FIG. 14 function as a brake fluid pressure decrement $\Delta Pdr$ setting means that sets brake fluid pressure decrement $\Delta Pdr$ for each VDC noncontrolled wheel.

As set out above, although the vehicle dynamics control system of the embodiment is exemplified in a rigid fourwheel-drive (4WD) vehicle in which a differential motion between front and rear wheel axles is permanently limited, it will be appreciated that the invention is not limited to the VDC equipped rigid 4WD shown and described herein, but the fundamental concept of the present invention may be applied to the other type of 4WDs, that is, a part-time 4WD, an on-demand 4WD or an active torque split 4WD that an engaging force of a transfer clutch is automatically controlled depending on an acceleration slip rate during vehicle acceleration and thus the driving torque distribution between front and rear road wheels is properly arbitrarily adjustable depending on the road surface condition, lateral load shift or longitudinal load shift. Furthermore, in the previously-discussed embodiment shown in FIGS. 1–9B, the state of lateral grip of the VDC noncontrolled wheel on the road is estimated by the magnitude of rear wheel load Wr and also rear wheel load Wr is map-retrieved or estimated based on longitudinal acceleration $\alpha_y$. Rear wheel load Wr may be estimated based on a suspension stroke that is sensed or monitored by means of a suspension stroke sensor. In lieu thereof, rear wheel load Wr may be estimated based on a change in tire pressure that is sensed or monitored by means of a tire-pressure sensor.

According to the VDC system of the shown embodiment, the VDC-noncontrolled-wheel brake fluid pressure reduction control mode (i.e., the opposite-side wheel brake fluid pressure reduction control mode is inhibited or canceled when the yaw rate deviation $\Delta\phi_{(n)}$ becomes adequate small and switches to a decreasing state, that is, under the specified condition defined by the intersection $\{(|\Delta\phi_{(n)}|<\alpha) \cap (|\Delta\phi_{(n-1)}|-|\Delta\phi_{(n)}|)>0\}$ of the first $(|\Delta\phi_{(n)}|<\alpha)$ and second $(|\Delta\phi_{(n-1)}|-|\Delta\phi_{(n)}|)>0)$ conditions. Instead of monitoring or using a change in yaw rate deviation $\Delta\phi_{(n)}$, a slip rate Sj for each VDC noncontrolled wheel may be used. In this case, the VDC-noncontrolled-wheel brake fluid pressure reduction control mode (i.e., the opposite-side wheel brake fluid pressure reduction control mode is inhibited or canceled when slip rate Sj for each VDC noncontrolled wheel becomes reduced to below a predetermined slip-rate threshold.

In the shown embodiment, during oversteer suppression control, a braking force for a VDC controlled wheel is applied to only the outside front wheel in the turn. In lieu thereof, the outside front and rear wheels in the turn are used as VDC controlled wheels. In this case, in order to reduce the braking force of the VDC noncontrolled wheel by an excess of the sum of (i) the first braking force and (ii) the second braking force (the transferred braking force) over a lateral-grip-force limit of the VDC noncontrolled wheel on the road, a final, new command value Pri*$_{(new)}$ for oversteer suppression control can be derived or calculated by subtracting brake fluid pressure decrement $\Delta$Pdr from only the brake-fluid-pressure command value Pri* of the turning inside rear wheel. In the shown embodiment, during understeer suppression control, a braking force for a VDC controlled wheel is applied to only the inside rear wheel in the turn. In lieu thereof, the inside front and rear wheels and the outside rear wheel in the turn are used as VDC controlled wheels. In this case, in order to reduce the braking force of the VDC noncontrolled wheel by an excess of the sum of (i) the first braking force and (ii) the second braking force (the transferred braking force) over a lateral-grip-force limit of the VDC noncontrolled wheel on the road, a final, new command value Pfo*$_{(new)}$ for understeer suppression control can be derived or calculated by subtracting brake fluid pressure decrement $\Delta$Pdr from only the brake-fluid-pressure command value Pfo* of the turning outside front wheel.

Moreover, in the shown embodiment, disk-type hydraulic brakes are used. Alternatively, a dynamo-electric brake (or an electric-operated brake caliper) may be used. The VDC system of the embodiment may use a brake-by-wire by means of which a brake fluid pressure supplied from a hydraulic power source, such as an oil pump, to the wheel-brake cylinder can be regulated depending on the driver's brake-pedal depression.

The entire contents of Japanese Patent Application Nos. 2002-148019 (filed May 22, 2002) and 2002-279316 (filed Sep. 25, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle dynamics control system for a four-wheel-drive vehicle employing a brake control system regulating braking forces applied to road wheels independently of each other and a differential mechanism controlling a differential motion between front and rear wheel axles, comprising:
    a braking-force compensation section that compensates for a braking force of at least one of a first wheel, which is subjected to vehicle dynamics control, and a second wheel to which a transferred braking force substantially corresponding to the braking force applied to the first wheel is transferred from the first wheel through the differential mechanism, to reduce a braking force of the second wheel by an excess of the braking force of the second wheel over a lateral grip limit of the second wheel during the vehicle dynamics control;
    a turning-behavior state variable detection section that detects a state variable of turning behavior of the vehicle;
    a control section that controls a braking force applied to each of the road wheels so that the state variable of turning behavior is brought closer to a desired value;
    a braking-force application device that applies a braking force to each of the road wheels, which is produced by a driver's brake-pedal depression; wherein
    the braking-force compensation section reduces the braking force of the second wheel, on which the transferred braking force acts, to prevent a sum of the braking force applied to the second wheel, produced by the driver's brake-pedal depression, and the transferred braking force, transferred from the first wheel via the differential mechanism to the second wheel, from exceeding a lateral grip limit of the second wheel, in presence of the driver's brake-pedal depression during the vehicle dynamics control.

2. The vehicle dynamics control system as set forth in claim 1, wherein:
    the braking-force compensation section compensates for the braking force of the first wheel, which is subjected to the vehicle dynamics control, based on a wheel load of each of the road wheels.

3. The vehicle dynamics control system as set forth in claim 1, further comprising:
    a lateral-grip state detection section that estimates a state of lateral grip of each of the road wheels on a road, from a wheel load of each of the road wheels;
    wherein the braking-force compensation section compensates for the braking force of the first wheel, which is subjected to the vehicle dynamics control, to bring the state variable of turning behavior closer to the desired value, and to reduce the braking force of the second wheel, based on the state of lateral grip of each of the road wheels on the road, estimated from the wheel load of each of the road wheels.

4. The vehicle dynamics control system as set forth in claim 3, wherein:

in an oversteer suppression control mode in which at least one of front wheels is subjected to the vehicle dynamics control and during vehicle deceleration with a driver's brake-pedal depression, the braking-force compensation section compensates for the braking force of the front wheel, which is subjected to the vehicle dynamics control, to bring the state variable of turning behavior closer to the desired value, so that the braking force of the front wheel, which is subjected to the vehicle dynamics control, decreases as a front wheel load increases.

5. The vehicle dynamics control system as set forth in claim 3, wherein:

in an oversteer suppression control mode in which at least one of front wheels is subjected to the vehicle dynamics control and during vehicle acceleration with a driver's accelerator-pedal depression, the braking-force compensation section compensates for the braking force of the front wheel, which is subjected to the vehicle dynamics control, to bring the state variable of turning behavior closer to the desired value, so that the braking force of the front wheel, which is subjected to the vehicle dynamics control, increases as a rear wheel load increases.

6. The vehicle dynamics control system as set forth in claim 3, wherein:

in an understeer suppression control mode in which at least one of rear wheels is subjected to the vehicle dynamics control and during vehicle acceleration with a driver's accelerator-pedal depression, the braking-force compensation section compensates for the braking force of the rear wheel, which is subjected to the vehicle dynamics control, to bring the state variable of turning behavior closer to the desired value, so that the braking force of the rear wheel, which is subjected to the vehicle dynamics control, decreases as a rear wheel load increases.

7. The vehicle dynamics control system as set forth in claim 3, wherein:

in an understeer suppression control mode in which at least one of rear wheels is subjected to the vehicle dynamics control and during vehicle deceleration with a driver's brake-pedal depression, the braking-force compensation section compensates for the braking force of the rear wheel, which is subjected to the vehicle dynamics control, to bring the state variable of turning behavior closer to the desired value, so that the braking force of the rear wheel, which is subjected to the vehicle dynamics control, increases as a front wheel load increases.

8. The vehicle dynamics control system as set forth in claim 1, wherein:

the braking-force compensation section comprises:
(a) a slip state detection section that detects a state of slip of the second wheel on which the transferred braking force acts;
(b) a lateral-grip margin calculation section that estimates a margin for the lateral grip of the second wheel, based on the state of slip of the second wheel; and
(c) a braking-force decrement calculation section that sets a braking force decrement of the second wheel based on the margin for the lateral grip of the second wheel.

9. The vehicle dynamics control system as set forth in claim 1, wherein:

the braking-force compensation section inhibits the braking force of the second wheel from being reduced when the state variable of turning behavior has been converged closer to the desired value.

10. The vehicle dynamics control system as set forth in claim 9, wherein:

the braking-force compensation section inhibits the braking force of the second wheel from being reduced when a first condition in which a deviation between the state variable of turning behavior and the desired value is less than a predetermined threshold value is satisfied, and simultaneously a second condition in which the deviation begins to reduce is satisfied.

11. The vehicle dynamics control system as set forth in claim 1, wherein:

in an oversteer suppression control mode in which at least one of front wheels is subjected to the vehicle dynamics control and during vehicle deceleration with the driver's brake-pedal depression, the braking-force compensation section reduces the braking force of each of rear wheels.

12. The vehicle dynamics control system as set forth in claim 1, wherein:

in an understeer suppression control mode in which at least one of rear wheels is subjected to the vehicle dynamics control and during vehicle deceleration with the driver's brake-pedal depression, the braking-force compensation section reduces the braking force of each of front wheels.

* * * * *